United States Patent
Yokomakura et al.

(10) Patent No.: US 11,317,400 B2
(45) Date of Patent: Apr. 26, 2022

(54) BASE STATION APPARATUS, TERMINAL APPARATUS, COMMUNICATION METHOD, AND INTEGRATED CIRCUIT

(71) Applicants: SHARP KABUSHIKI KAISHA, Sakai (JP); FG Innovation Company Limited, New Territories (HK)

(72) Inventors: Kazunari Yokomakura, Sakai (JP); Shohei Yamada, Sakai (JP); Masayuki Hoshino, Sakai (JP); Hidekazu Tsuboi, Sakai (JP); Hiroki Takahashi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 71 days.

(21) Appl. No.: 17/042,905

(22) PCT Filed: Mar. 29, 2019

(86) PCT No.: PCT/JP2019/013981
§ 371 (c)(1),
(2) Date: Sep. 28, 2020

(87) PCT Pub. No.: WO2019/189751
PCT Pub. Date: Oct. 3, 2019

(65) Prior Publication Data
US 2021/0058910 A1   Feb. 25, 2021

(30) Foreign Application Priority Data
Mar. 30, 2018   (JP) .............................. JP2018-067286

(51) Int. Cl.
*H04W 72/04* (2009.01)
*H04L 5/00* (2006.01)

(52) U.S. Cl.
CPC ......... *H04W 72/042* (2013.01); *H04L 5/0048* (2013.01)

(58) Field of Classification Search
CPC .................... H04W 72/042; H04L 5/0048
See application file for complete search history.

(56) References Cited

U.S. PATENT DOCUMENTS

2019/0174466 A1* 6/2019 Zhang ..................... H04L 5/005
2019/0296805 A1* 9/2019 Son ................... H04W 72/0413

OTHER PUBLICATIONS

NTT DoCoMo, "Revision of SI: Study on New Radio Access Technology", RP-161214, 3GPP TSG RAN Meeting #72, Busan, Korea, Jun. 13-16, 2016.

(Continued)

*Primary Examiner* — Ronald B Abelson
(74) *Attorney, Agent, or Firm* — ScienBiziP, P.C.

(57) ABSTRACT

To efficiently transmit a sounding reference signal. One or more downlink BWPs are configured in a serving cell, one or more uplink BWPs are configured in a serving cell, each BWP of the one or more downlink BWPs is identified by a downlink BWP index, each BWP of the one or more uplink BWPs is identified by the uplink BWP index, and in a case that one of the one or more downlink BWPs configured is activated in a serving cell, one of the one or more uplink BWPs configured is activated in a serving cell, and an SRS transmission in one or more serving cells of a plurality of the serving cells is triggered, the SRS for the BWP indicated by the uplink BWP index activated in the serving cell activated is transmitted.

4 Claims, 10 Drawing Sheets

(56) References Cited

OTHER PUBLICATIONS

Sony, "Summary of SRS", R1-1803410, 3GPP TSG RAN WG1 Meeting #92, Athens, Greece, Feb. 26-Mar. 2, 2018.
ZTE, Sanechips, "Remaining details on SRS", R1-1801588, 3GPP TSG RAN WG1 Meeting #92, Athens, Greece, Feb. 26-Mar. 2, 2018.
3GPP TS 38.213 V1.2.0 (Nov. 2017) 3rd Generation Partnership Project; Technical Specification Group Radio Access Network; NR; Physical layer procedures for control (Release 15).

* cited by examiner

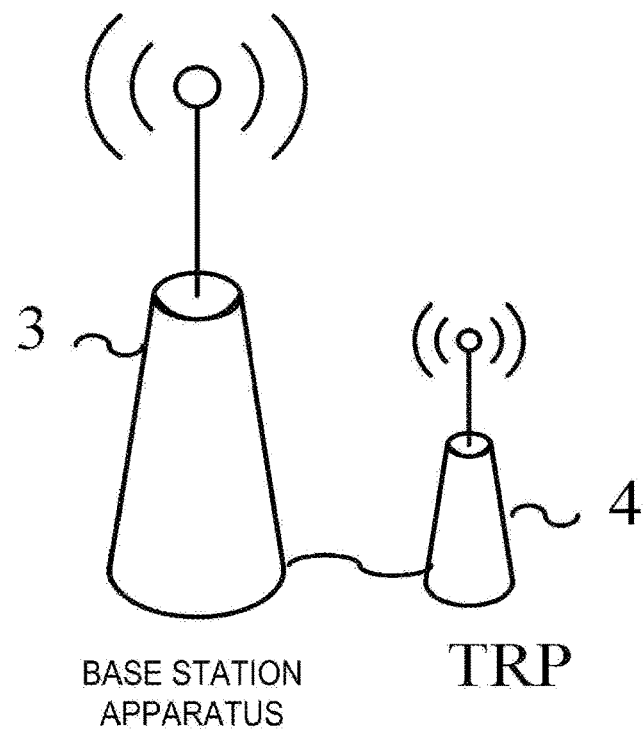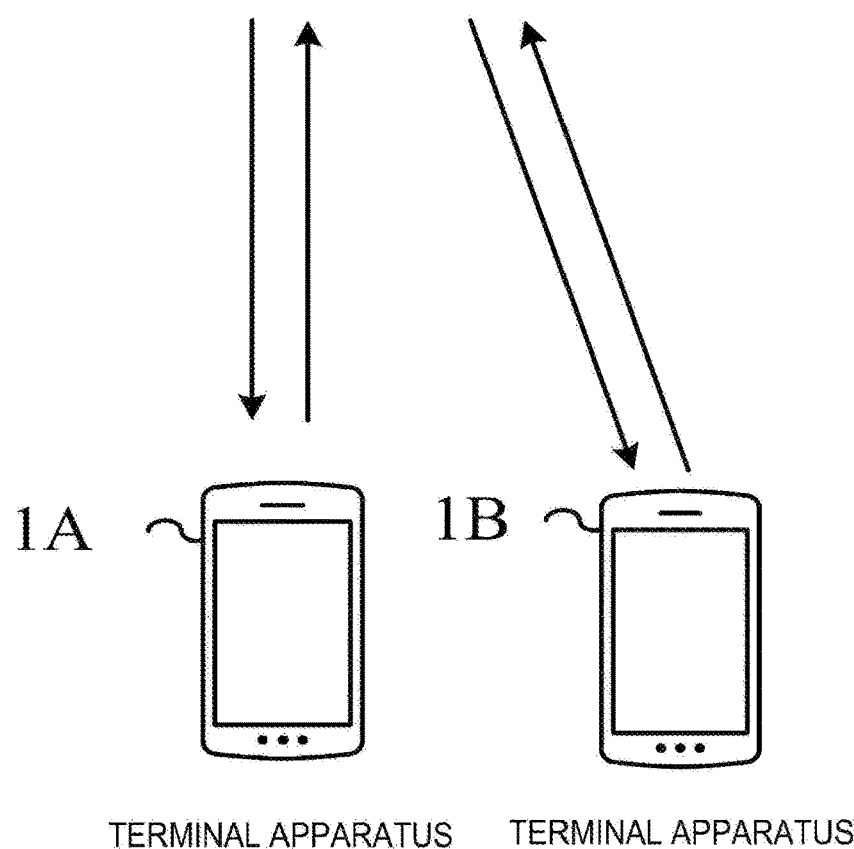
FIG. 1

FIG. 7

SRS REQUEST FIELD (DCI)

| VALUE | CONTENTS |
|---|---|
| 00 | NOT TRANSMIT SRS |
| 01 | TRANSMIT SRS RESOURCE SET ASSOCIATED WITH TRIGGER STATE #0 OF SERVING CELL #1 |
| 10 | TRANSMIT SRS RESOURCE SET ASSOCIATED WITH TRIGGER STATE #1 OF SERVING CELL #1 |
| 11 | TRANSMIT SRS RESOURCE SET ASSOCIATED WITH TRIGGER STATE #2 OF SERVING CELL #1 |

RRC

SRS CONFIGURATION #1

SERVING CELL #1
BWP INDEX #1

SRS RESOURCE SET CONFIGURATION #0
- TIME DOMAIN BEHABIOR: PERIODIC
- SPATIAL RELATIONSHIP INFORMATION: SYNCHRONIZATION SIGNAL BLOCK #1
- PERIOD: 40 SLOTS

SRS RESOURCE SET CONFIGURATION #1
- TIME DOMAIN BEHABIOR: APERIODIC
- SPATIAL RELATIONSHIP INFORMATION: CSI REFERENCE SIGNAL #1
- TRIGGER STATE #0

SRS RESOURCE SET CONFIGURATION #2
- TIME DOMAIN BEHABIOR: APERIODIC
- SPATIAL RELATIONSHIP INFORMATION: SYNCHRONIZATION SIGNAL BLOCK #1
- TRIGGER STATE #1

SRS RESOURCE SET CONFIGURATION #3
- TIME DOMAIN BEHABIOR: APERIODIC
- SPATIAL RELATIONSHIP INFORMATION:
- SRS RESOURCE #2
- TRIGGER STATE #2

| SRS REQUEST FIELD (DCI) | |
|---|---|
| VALUE | CONTENTS |
| 00 | NOT TRANSMIT SRS |
| 01 | TRANSMIT SRS RESOURCE SET ASSOCIATED WITH TRIGGER STATE #0 OF SERVING CELL #1 AND TRIGGER STATE #0 OF SERVING CELL #2 |
| 10 | TRANSMIT SRS RESOURCE SET ASSOCIATED WITH TRIGGER STATE #1 OF SERVING CELL #1 AND TRIGGER STATE #1 OF SERVING CELL #2 |
| 11 | TRANSMIT SRS RESOURCE SET ASSOCIATED WITH TRIGGER STATE #2 OF SERVING CELL #1 AND TRIGGER STATE #2 OF SERVING CELL #2 |

RRC

SRS CONFIGURATION #2

SERVING CELL #2
BWP INDEX #active

SRS RESOURCE SET CONFIGURATION #0
- TIME DOMAIN BEHABIOR: SEMI-PERSISTENT
- SPATIAL RELATIONSHIP INFORMATION: CSI REFERENCE SIGNAL #0
- PERIOD: 20 SLOTS

SRS RESOURCE SET CONFIGURATION #1
- TIME DOMAIN BEHABIOR: APERIODIC
- SPATIAL RELATIONSHIP INFORMATION: SYNCHRONIZATION SIGNAL BLOCK #2
- TRIGGER STATE #1

SRS RESOURCE SET CONFIGURATION #2
- TIME DOMAIN BEHABIOR: APERIODIC
- SPATIAL RELATIONSHIP INFORMATION: SRS RESOURCE #1
- TRIGGER STATE #2

SRS RESOURCE SET CONFIGURATION #3
- TIME DOMAIN BEHABIOR: PERIODIC
- SPATIAL RELATIONSHIP INFORMATION: CSI REFERENCE SIGNAL #3
- ASSOCIATED CSI REFERENCE SIGNAL #3

SRS CONFIGURATION #1

SERVING CELL #1
BWP INDEX #1

SRS RESOURCE SET CONFIGURATION #0
- TIME DOMAIN BEHABIOR: PERIODIC
- SPATIAL RELATIONSHIP INFORMATION: SYNCHRONIZATION SIGNAL BLOCK #1
- CSI REFERENCE SIGNAL #0
- PERIOD: 40 SLOTS

SRS RESOURCE SET CONFIGURATION #1
- TIME DOMAIN BEHABIOR: APERIODIC
- SPATIAL RELATIONSHIP INFORMATION: CSI REFERENCE SIGNAL #1
- TRIGGER STATE #0

SRS RESOURCE SET CONFIGURATION #2
- TIME DOMAIN BEHABIOR: APERIODIC
- SPATIAL RELATIONSHIP INFORMATION: SYNCHRONIZATION SIGNAL BLOCK #1
- TRIGGER STATE #1

SRS RESOURCE SET CONFIGURATION #3
- TIME DOMAIN BEHABIOR: APERIODIC
- SPATIAL RELATIONSHIP INFORMATION: SRS RESOURCE #2
- TRIGGER STATE #2

FIG. 8

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit. This application claims priority based on JP 2018-67286 filed on Mar. 30, 2018, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by The Third Generation Partnership Project (3GPP) (NPL 1).

The fifth generation cellular system requires three assumption scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of an aspect of the present invention is that a base station apparatus and a terminal apparatus in the radio communication systems as described above efficiently provide a terminal apparatus, a base station apparatus, a communication method, and an integrated circuit.

Solution to Problem (1) To accomplish the object described above, aspects of the present invention are contrived to provide the following measures. Specifically, a terminal apparatus according to an aspect of the present invention includes a receiver configured to receive a physical downlink control channel carrying downlink control information including a first information field, and a transmitter configured to transmit a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated in the serving cell activated is transmitted.

(2) A base station apparatus according to an aspect of the present invention includes a transmitter configured to transmit a physical downlink control channel carrying downlink control information including a first information field, and a receiver configured to receive a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated in the serving cell activated is received.

(3) A communication method according to an aspect of the present invention is a communication method for a terminal apparatus, the method including receiving a physical downlink control channel carrying downlink control information including a first information field, and transmitting a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each serving cell, and an SRS transmission in one or more serving cells of the plurality of the serving cells is triggered, the SRS for the BWP indicated by the uplink BWP index activated in the serving cell activated is transmitted.

(4) A communication method according to an aspect of the present invention is a communication method for a base station apparatus, the method including transmitting a physical downlink control channel carrying downlink control information including a first information field, and receiving a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more configured uplink BWPs is activated in each of the plurality of the serving cells, and an SRS transmission in one or more serving cells of the plurality of the serving cells is triggered, the SRS for the BWP indicated by the uplink BWP index activated in the serving cell activated is received.

(5) An integrated circuit according to an aspect of the present invention is an integrated circuit mounted on a terminal apparatus, the integrated circuit including a receiving unit configured to receive a physical downlink control channel carrying downlink control information including a first information field, and a transmitting unit configured to transmit a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated in the serving cell activated is transmitted.

(6) An integrated circuit according to an aspect of the present invention is an integrated circuit mounted on a base station apparatus, the integrated circuit including a transmitting unit configured to transmit a physical downlink control channel carrying downlink control information including a first information field, and a receiving unit configured to receive a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated in the serving cell activated is received.

Advantageous Effects of Invention

According to an aspect of the present invention, a base station apparatus and a terminal apparatus can efficiently communicate with each other.

BRIEF DESCRIPTION OF DRAWINGS

FIG. 1 is a diagram illustrating a concept of a radio communication system according to the present embodiment.

FIG. 7 is a diagram illustrating an example related to an SRS configuration.

FIG. 8 is a diagram illustrating an example related to an SRS configuration in a case that multiple serving cells are configured.

DESCRIPTION OF EMBODIMENTS

Figure 2:
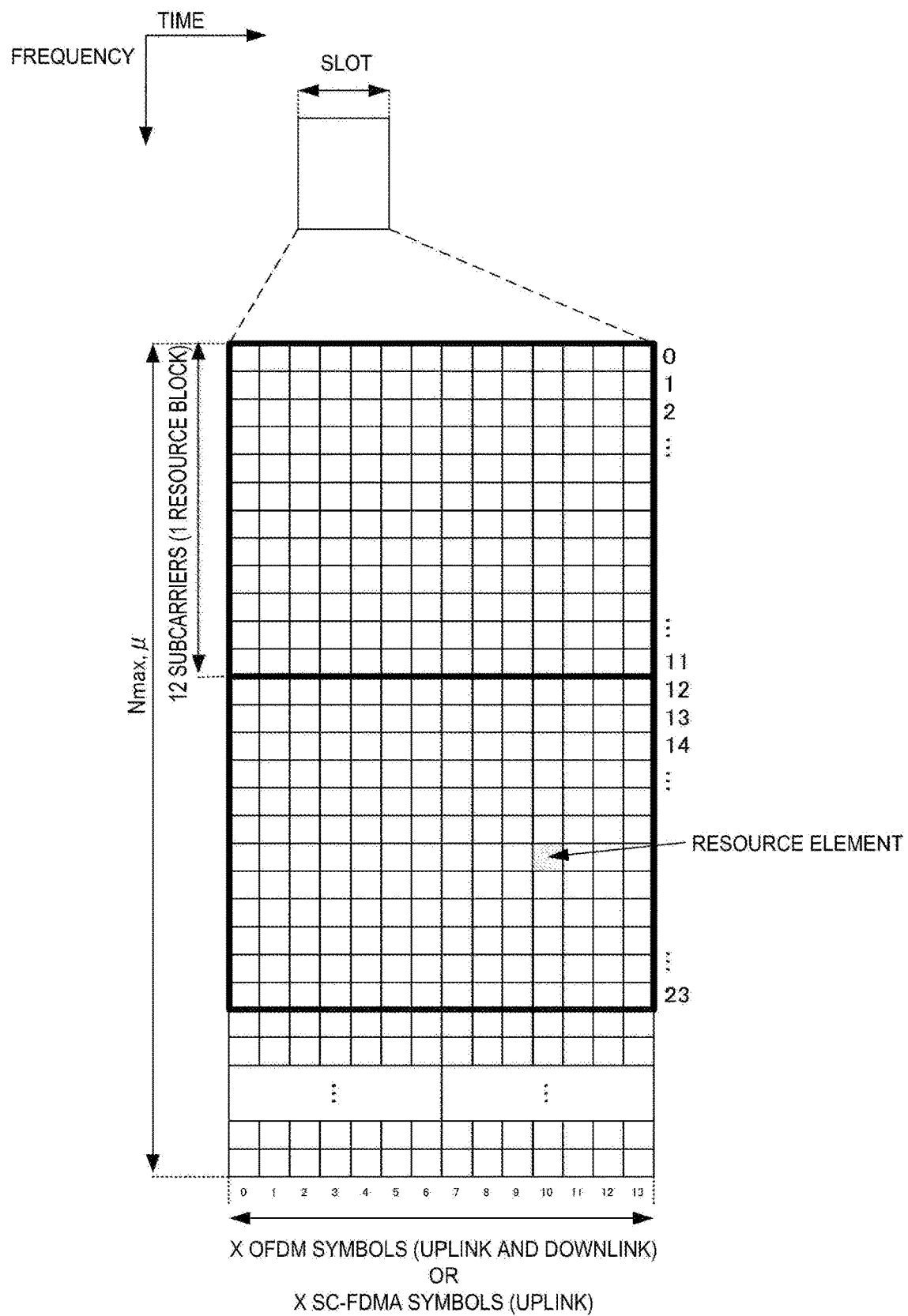
FIG. 2 is a diagram illustrating an example of a schematic configuration of an uplink or downlink slot according to the present embodiment.

Embodiments of the present invention will be described below.

FIG. 1 is a conceptual diagram of a radio communication system according to the present embodiment. In FIG. 1, the radio communication system includes a terminal apparatus 1A, a terminal apparatus 1B, and a base station apparatus 3. Hereinafter, the terminal apparatus 1A and the terminal apparatus 1B are also referred to as a terminal apparatus 1.

The terminal apparatus 1 is also called a user terminal, a mobile station apparatus, a communication terminal, a mobile apparatus, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB. The base station apparatus 3 may include a core network apparatus. Furthermore, the base station apparatus 3 may include one or more transmission reception points (TRPs) 4. At least some of functions/processes of the base station apparatus 3 described below may be functions/processes at each of the transmission reception points 4 included in the base station apparatus 3. The base station apparatus 3 may have a communicable range (communication area), controlled by the base station apparatus 3, that includes one or more cells to serve the terminal apparatus 1. Furthermore, the base station apparatus 3 may have a communicable range (communication area), controlled by one or more transmission reception points 4, that includes one or more cells to serve the terminal apparatus 1. Furthermore, one cell may be divided into multiple beamed areas, and the terminal apparatus 1 may be served in each of the Beamed areas. Here, a beamed area may be identified based on a beam index used for beamforming or a precoding index.

A radio communication link from the base station apparatus 3 to the terminal apparatus 1 is referred to as a downlink. A radio communication link from the terminal apparatus 1 to the base station apparatus 3 is referred to as an uplink.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using an OFDM symbol with the assumption that a transmission scheme is OFDM, and a case of using any other transmission scheme described above is also included in the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential information needed by the terminal apparatus 1.

The PBCH may be used to broadcast a time index within a period of a block of synchronization signals (also referred to as SS/PBCH block). Here, the time index is information indicating indexes of the synchronization signal and PBCH in the cell. For example, in a case that assumptions for three transmission beams (also referred to as transmission filter configuration, Quasi Co-Location (QCL) for a reception spatial parameter, or spatial domain transmission filter) are used to transmit the SS/PBCH block, an order of time within a predetermined period or a configured period may be indicated. The terminal apparatus may recognize a difference in time index as a difference in the transmission beam.

The PDCCH is used to transmit (or carry) Downlink Control Information (DCI) in a downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the following DCI formats may be defined.
DCI format 0_0
DCI format 0_1
DCI format 1_0
DCI format 1_1
DCI format 2_0
DCI format 2_1
DCI format 2_2
DCI format 2_3

DCI format 0_0 may include information indicating the PUSCH scheduling information (frequency domain resource allocation and time domain resource allocation).

DCI format 0_1, may include information indicating PUSCH scheduling information (frequency domain resource allocation and time domain resource allocation), information indicating a BandWidth Part (BWP), a Channel State Information (CSI) request, a Sounding Reference Signal (SRS) request, and information on an antenna port.

DCI format 1_0 may include information indicating the PDSCH scheduling information (frequency domain resource allocation and time domain resource allocation).

DCI format 1_1 may include information indicating PDSCH scheduling information (frequency domain resource allocation and time domain resource allocation), information indicating a bandwidth part (BWP), a Transmission Configuration Indication (TCI), and information on an antenna port.

DCI format 2_0 is used to notify a slot format of one or more slots. The slot format is defined such that each of OFDM symbols in the slot is classified into any of downlink, flexible, or uplink. For example, in a case that the slot format is 28, "DDDDDDDDDDDDFU" is applied to OFDM symbols of 14 symbols in the slot in which the slot format 28 is indicated. Here, D is a downlink symbol, F is a flexible symbol, and U is an uplink symbol. Note that the slots are described below.

DCI format 2_1 is used to notify the terminal apparatus 1 of physical resource blocks and OFDM symbols, which may be assumed to be not transmitted. Note that this information may be referred to as a pre-emption indication (discontinuous transmission indication).

DCI format 2_2 is used to transmit a PUSCH and a Transmit Power Control (TPC) command for PUSCH.

DCI format 2_3 is used to transmit a group of TPC commands for a sounding reference signal (SRS) transmission by one or more terminal apparatuses 1. The SRS request may be transmitted with the TPC command. The SRS request and the TPC command may be defined in DCI format 23 for uplink with no PUSCH and PUCCH, or uplink in which the SRS transmit power control is not associated with the PUSCH transmit power control.

The DCI for the downlink is also referred to as a downlink grant or a downlink assignment. The DCI for the uplink is also referred to as an uplink grant or an Uplink assignment.

The PUCCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ- ACK for downlink data (Transport block, Medium Access Control Protocol Data Unit (MAC PDU), or Downlink-Shared Channel (DL-SCH)).

The PDSCH is used to transmit downlink data (Downlink Shared CHannel (DL-SCH)) from a Medium Access Control (MAC) layer. Furthermore, in a case of the downlink, the PSCH is used to transmit System Information (SI), a Random Access Response (RAR), and the like.

The PUSCH may be used to transmit uplink data (Uplink-Shared CHannel (UL-SCH)) from the MAC layer or a HARQ-ACK and/or CSI with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling. The higher layer herein means a higher layer viewed from the physical layer, and thus, may include one or more layers of a MAC layer, an RRC layer, an RLC layer, a PDCP layer, a Non Access Stratum (NAS) layer, and the like. For example, the higher layer in a process of the MAC layer may include one or more layers of an RRC layer, an RLC layer, a PDCP layer, a NAS layer, and the like.

The PDSCH or PUSCH may be used to transmit the RRC signaling and the MAC control element. Here, in the PDSCH, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, information specific to the terminal apparatus (user-equipment-specific (UE-specific) information) may be transmitted through signaling dedicated to the certain terminal apparatus 1. In addition the PUSCH may be used to transmit UE Capabilities in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration, or a spatial domain transmission filter or a spatial domain reception filter.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for Fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management, and a periodic, semi-persistent, or aperiodic CSI reference signal transmission method is adopted. As the CSI-RS, a Non-Zero Power (NZP) CSI-RS and a Zero Power (ZP) CSI-RS for which the transmit power (or received power) is zero may be defined. Here, the ZP CSI-RS may be defined as a CSI-RS resource in which the transmit power is zero or which is not transmitted. The PTRS is used to track the phase in the time axis to ensure frequency offset due to phase noise. The TRS is used to ensure Doppler shift during fast travel. Note that the TRS may be used as one configuration for the CSI-RS. For example, a radio resource may be configured with one port CSI-RS being a TRS.

In the present embodiment, any one or more of the following uplink reference signals are used.

Demodulation Reference Signal (DMRS)
Phrase Tracking Reference Signal (PTRS)
Sounding Reference Signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink channel state information (CSI), channel sounding, and beam management. The PTRS is used to track the phase in the time axis to ensure frequency offset due to phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a transport block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that a procedure described below may be included as a procedure for constituting, configuring, or establishing a beam pair link.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

The beam management may include the beam selection and the beam refinement. The beam recovery may include the following procedures.

Detection of beam failure
Discovery of new beam
Transmission of beam recovery request
Monitoring of response to beam recovery request For example, for selecting the transmission beam of the base station apparatus 3 in the terminal apparatus 1, Reference Signal Received Power (RSRP) of an SSS included in a CSI-RS or SS/PBCH block may be used, or the CSI may be used. As a report to the base station apparatus 3, a CSI-RS Resource Index (CRI) may be used, or an index may be used that is indicated in a sequence of the PBCH included in the SS/PBCH block and/or demodulation reference signals (DMRS) used to demodulate the PBCH.

The base station apparatus 3 indicates the time index of the CRI or SS/PBCH in indicating the beam to the terminal apparatus 1, and the terminal apparatus 1 performs reception based on the indicated time index of the CRI or SS/PBCH. At this time, the terminal apparatus 1 may configure a spatial filter based on the indicated time index of the CRI or SS/PBCH to perform reception. The terminal apparatus 1 may perform reception by use of a Quasi-Co-Location (QCL) assumption. A certain signal (such as antenna port, synchronization signal, reference signal) "being in QCL" with another signal (such as antenna port, synchronization signal, reference signal) or "for which QCL assumption is used" can be interpreted as that the certain signal is associated with the relevant another signal.

If a Long Term Property of a channel on which a symbol is carried at an antenna port can be estimated from a channel on which a symbol is carried at another antenna port, those two antenna ports are said to be in QCL. The long term property of the channel includes at least one of a delay spread, a Doppler spread, a Doppler shift, an average gain, or an average delay. For example, in a case that an antenna port 1 and an antenna port 2 are in QCL for an average delay, it is meant that a reception timing of the antenna port 2 may be estimated from a reception timing of the antenna port 1.

The QCL may also be expanded to beam management. For this purpose, spatially expanded QCL may be newly defined. For example, the Long term property of a channel in spatial domain QCL assumption may be an arrival angle (Angle of Arrival (AoA), Zenith angle of Arrival (ZoA), or the like) and/or an Angle Spread (for example, Angle Spread of Arrival (ASA) and Zenith angle Spread of Arrival (ZSA)), a transmission angle (AoD, ZoD, or the like) or an Angle Spread of the transmission angle (for example, Angle Spread of Departure (ASD) or Zenith angle Spread of Departure (ZSD)), a Spatial Correlation, or a reception spatial parameter, in a radio link or channel.

For example, in a case that the antenna port 1 and the antenna port 2 are considered to be in QCL with respect to the reception spatial parameter, this means that a reception beam for receiving signals from the antenna port 2 may be estimated from a reception beam (reception spatial filter) for receiving signals from the antenna port 1.

A combination of long term properties which may be considered to be in QCL may be defined as the QCL type. For example, the following types may be defined.

Type A: Doppler shift, Doppler spread, average delay, delay spread
Type B: Doppler shift, Doppler spread
Type C: average delay, Doppler shift
Type D: reception spatial parameter The above-described QCL types may configure and/or indicate a Transmission Configuration Indication (TCI) as a QCL assumption between one or two reference signals and the PDCCH or PDSCH DMRS in the RRC and/or the MAC layer and/or the DCI. For example, in a case that an index #2 of the PBCH/SS block and the QCL type A+QCL type B are configured and/or indicated as one state of the TCI in a case that the terminal apparatus 1 receives the PDCCH, the terminal apparatus 1 in receiving the PDCCH DMRS may consider the Doppler shift, the Doppler spread, the average delay, the delay spread, and the reception space parameters as the long term properties of the channels in the reception of the PBCH/SS block index #2 to receive the PDCCH DMRS, and perform synchronization or channel estimation. At this time, a reference signal indicated by the TCI (PBCH/SS block in the example described above) may be referred to as a source reference signal, and a reference signal affected by the long term properties estimated from the long term properties of the channel at the time of the source reference signal is received (the PDCCH DMRS in the example described above) may be referred to as a target reference signal. The TCI may be configured with a combination of a source reference signal and a QCL type for multiple TCI states and each state in the RRC and indicated to the terminal apparatus 1 by way of the MAC layer or the DCI.

According to this method, as the beam management and beam indication/report, the operations of the base station apparatus 3 and terminal apparatus 1 equivalent to the beam management may be defined by the spatial domain QCL assumption and the radio resource (time and/or frequency).

The subframe will now be described. The subframe in the present embodiment may also be referred to as a resource unit, a radio frame, a time period, or a time interval.

FIG. 2 is a diagram illustrating an example of a schematic configuration of an uplink or downlink slot according to a first embodiment of the present invention. Each of the radio frames is 10 ms in length. Furthermore, each of the radio frames includes 10 subframes and W slots. For example, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. For example, in the case of X=14, W=10 in a case that the subcarrier spacing is 15 kHz, and W=40 in a case that the subcarrier spacing is 60 kHz. FIG. 2 illustrates the case of X=7 as an example. Note that a case of X=14 can be similarly configured by expanding the case of X=7. Furthermore, the uplink slot is defined similarly, and the downlink slot and the uplink slot may be defined separately. The bandwidth of the cell of FIG. 2 may also be defined as a part of band (that is may be a BWP). The slot may be defined as a Transmission Time Interval (TTI). The slot may not be defined as a TTI. The TTI may be a transmission period of the transport block.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element in the resource grid is referred to as a resource element. The resource element may be identified by using a subcarrier number and an OFDM symbol number.

The resource grid is used to represent mapping of a certain physical downlink channel (such as the PDSCH) or a certain physical uplink channel (such as the PUSCH) to resource elements. For example, in the case that the subcarrier spacing is 15 kHz, in a case that the number X of OFDM symbols included in a subframe is 14 and the NCPs are used, one physical resource block is defined by 14 consecutive OFDM symbols in the time domain and by 12*Nmax consecutive subcarriers in the frequency domain. Nmax represents the maximum number of resource blocks determined by a subcarrier spacing configuration µ described below. Hence, the resource grid includes (14*12*Nmax, µ) resource elements. In a case of Extended CPs (ECPs), which is supported only in the subcarrier spacing of 60 kHz, for example, one physical resource block is defined by 12 (the number of OFDM symbols included in one slot)*4 (the number of slot included in one subframe)=48 consecutive OFDM symbols in the time domain and by 12*Nmax, µ, consecutive subcarriers in the frequency domain. Hence, the resource grid includes (48*12*Nmax, µ) resource elements.

As the resource block, a common resource block, a physical resource block, and a virtual resource block are defined. One resource block is defined as 12 subcarriers consecutive in the frequency domain. A subcarrier index 0 at a common resource block index 0 may be referred to as a reference point A (which may be referred to as a point A"). The common resource block is a resource block numbered from 0 in ascending order in each subcarrier spacing configuration y from the reference point A. The resource grid described above is defined by this common resource block. The physical resource block is a resource block included in a bandwidth part (BWP) described below and numbered from 0 in ascending order, and the physical resource block is a resource block included in a bandwidth part (BWP) and numbered from 0 in ascending order. A certain physical uplink channel is first mapped to a virtual resource block. Thereafter, the virtual resource block is mapped to a physical resource block.

Next, the subcarrier spacing configuration µ will be described. In NR, multiple OFDM numerologies are supported as described above. The subcarrier spacing µ (µ=0, 1, ... , 5) and the cyclic prefix length are given by a higher layer for the downlink BWP and by a higher layer in the uplink BWP. Where µ is given, a subcarrier spacing Δf is given by Δf=2^µ·15 (kHz).

In the subcarrier spacing configuration µ, the slots are counted in ascending order from 0 to N^{subframe, µ}{slot}−1 within the subframe, and counted in ascending order from 0 to N^{frame, µ}_{slot}−1 within the frame. N^{slot}_{symb} consecutive OFDM symbols are in the slots based on the slot configuration and cyclic prefix. N^{slot}_symb is 14. The start of the slot n^{µ}_{s} in the subframe is aligned with the start and time of the (n^{µ} {s} N^{slot}_{symb})-th OFDM symbol in the same subframe.

Figure 3:
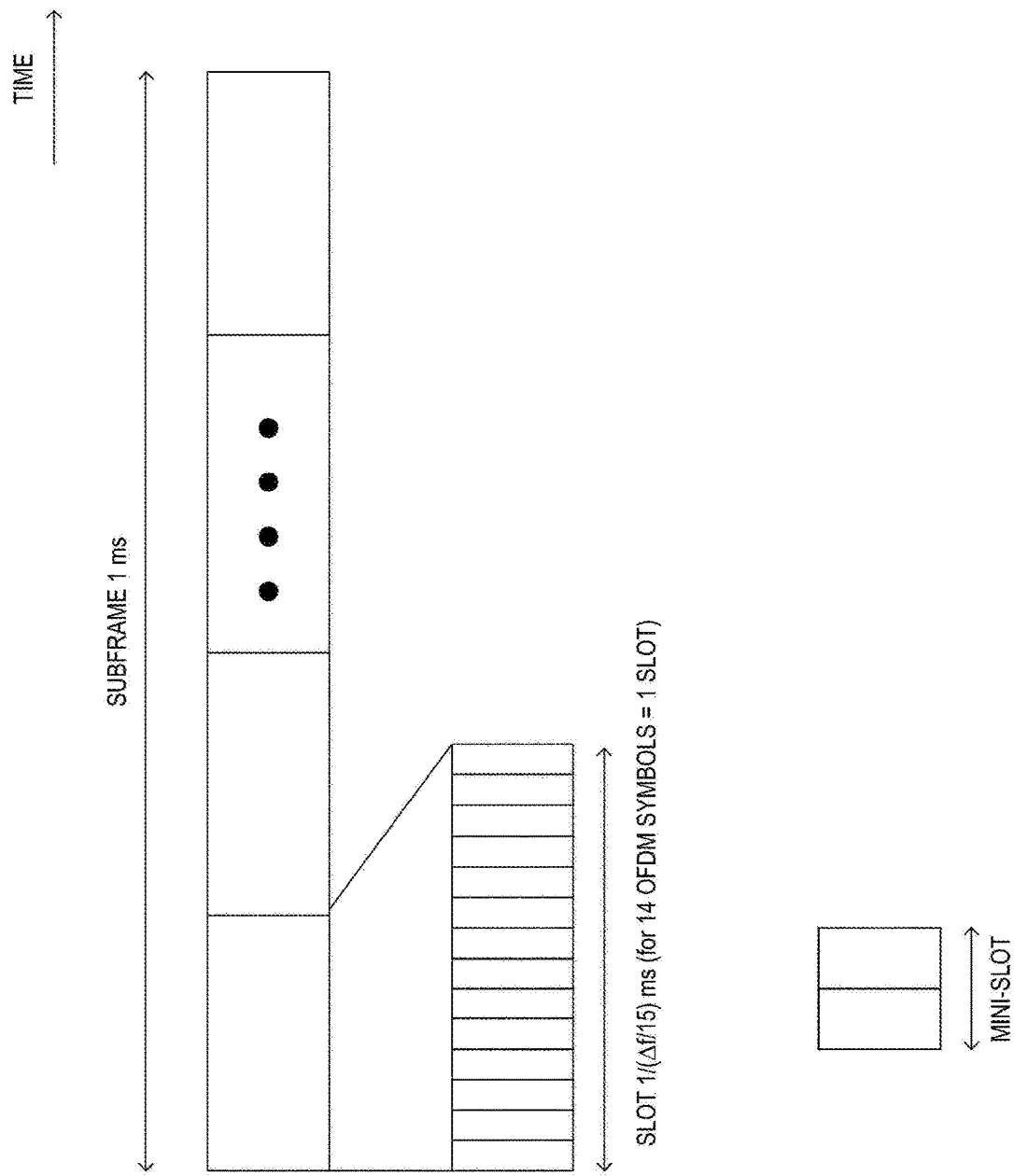
FIG. 3 is a diagram illustrating a relationship between a subframe and a slot and a mini-slot in a time domain.

The subframe, the slot, and a mini-slot will now be described. FIG. 3 is a diagram illustrating a relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. The downlink slot may be referred to as a PDSCH mapping type A. The uplink slot may be referred to as a PUSCH mapping type A.

The mini-slot (which may be referred to as a sub-slot) is a time unit including OFDM symbols that are less in number than the OFDM symbols included in the slot. FIG. 3 illustrates, by way of example, a case in which the mini-slot includes two OFDM symbols. The OFDM symbols in the mini-slot may match the timing for the OFDM symbols constituting the slot. Note that the smallest unit of scheduling may be a slot or a mini-slot. Assigning a mini-slot may be referred to as non-slot based scheduling. A mini-slot being scheduled may be expressed as that a resource in which the relative time positions of the starting positions of the reference signal and the data are fixed is scheduled. The downlink mini-slot may be referred to as a PDSCH mapping type B. The uplink mini-slot may be referred to as a PUSCH mapping type B.

Figure 4:
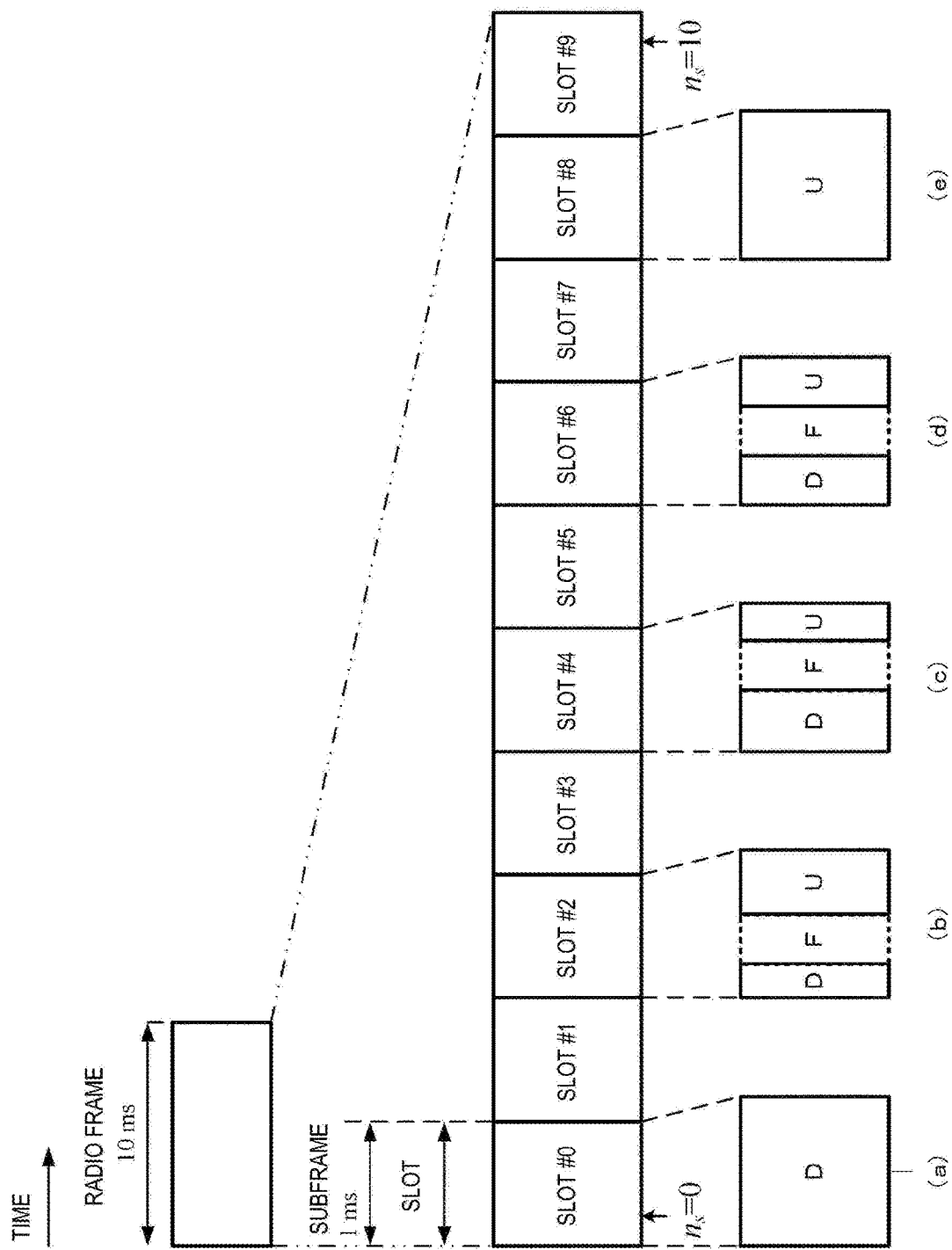
FIG. 4 is a diagram illustrating examples of a slot or a subframe.

FIG. 4 is a diagram illustrating an example of a slot format. Here, a case that the slot length is 1 ms at the subcarrier spacing of 15 kHz is illustrated as an example. In FIG. 4, D represents the downlink, and U represents the uplink. As illustrated in FIG. 4, during a certain time period (for example, the minimum time period to be allocated to one UE in the system), the subframe may include one or more of the followings:
  downlink part symbol,
  flexible symbol, or
  uplink symbol. Note that a ratio of these may be predetermined as slot formats.
The ratio of these may also be defined by the number of downlink OFDM symbols included in the slot, or the start position and end position within the slot. The ratio of these may also be defined by the number of uplink OFDM symbols or DFT-S-OFDM symbols included in the slot, or the start position and end position within the slot. Note that the slot being scheduled may be expressed as that a resource in which the relative time positions of the reference signal and a slot boundary are fixed is scheduled.

The terminal apparatus 1 may receive a downlink signal or a downlink channel in a downlink symbol or a flexible symbol. The terminal apparatus 1 may transmit an uplink signal or a downlink channel in an uplink symbol or a flexible symbol.

FIG. 4(*a*) is an example in which in a certain time period (which may be referred to as, for example, a minimum unit of time resource that can be allocated to one UE, a time unit, or the like, or multiple minimum units of time resource may be bundled and referred to as a time unit) is entirely used for downlink transmission. FIG. 4(*b*) illustrates an example in which an uplink is scheduled via a PDCCH, for example, by using the first time resource, through a flexible symbol including a processing delay of the PDCCH, a time for switching from a downlink to an uplink, and generation of a transmit signal, and then, an uplink signal is transmitted. FIG. 4(*c*) illustrates an example in which the first time resource is used for a PDCCH and/or downlink PDSCH transmission, and then, through a gap for a processing delay, a time for switching from a downlink to an uplink, and generation of a transmit signal, a PUSCH or PUCCH is transmitted. Here, for example, the uplink signal may be used to transmit the HARQ-ACK and/or CSI, namely, the UCI. FIG. 4 (*d*) illustrates an example in which the first time resource is used for a PDCCH and/or PDSCH transmission, and then, through a gap for a processing delay, a time for switching from a downlink to an uplink, and generation of a transmit signal, an uplink PUSCH and/or PUCCH is transmitted. Here, for example, the uplink signal may be used to transmit the uplink data, namely, the UL-SCH. FIG. 4(*e*) illustrates an example in which the entire slot is used for uplink transmission (PUSCH or PUCCH).

The above-described downlink part and uplink part may include multiple OFDM symbols as is the case with LTE.

Figure 5:
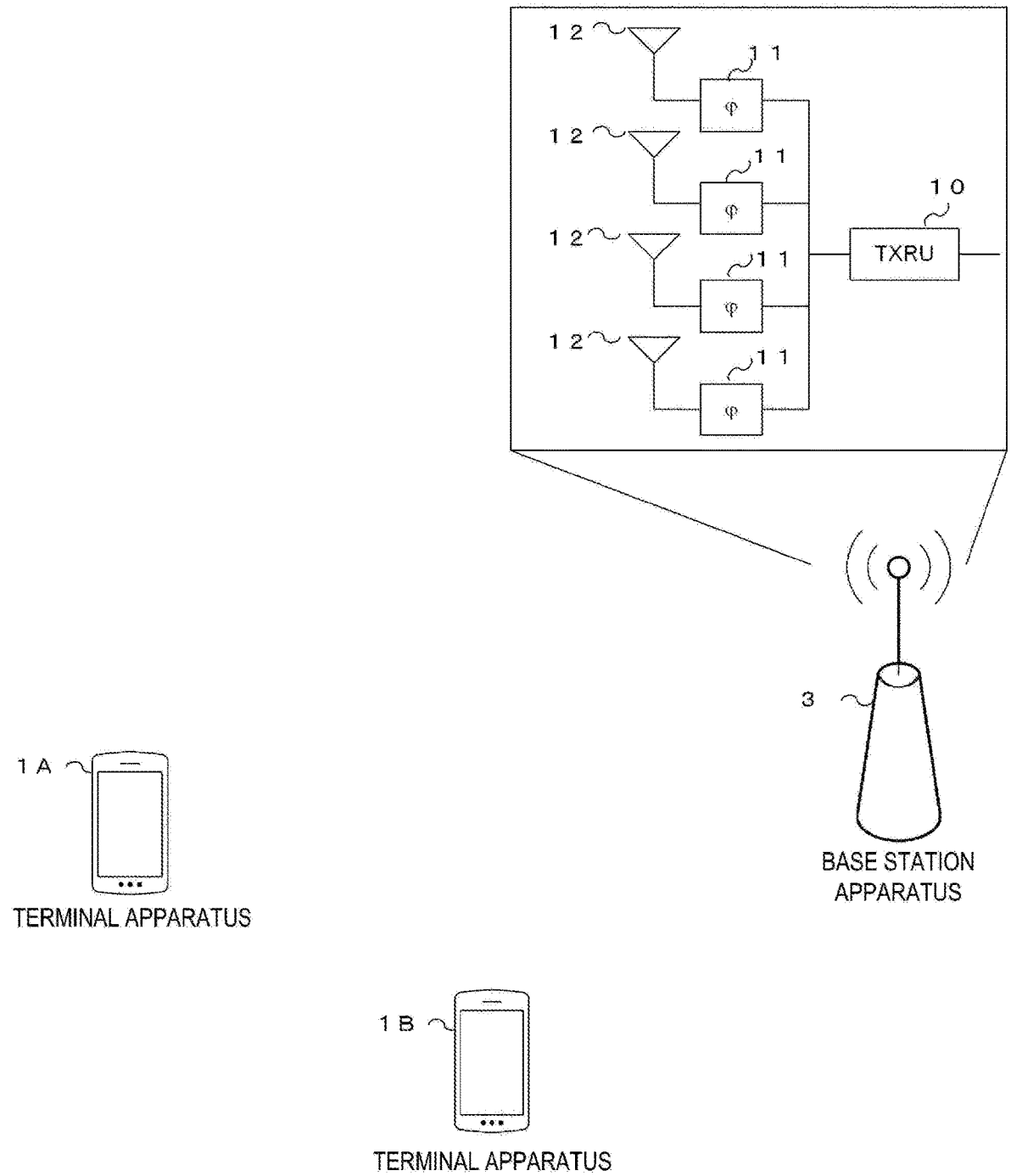
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

Hereinafter, the bandwidth part (BWP) will be described. The BWP is also referred to as a carrier BWP. The BWP may be configured for each of the downlink and the uplink. The BWP is defined as a set of consecutive physical resources selected from continuous subsets of common resource blocks. The terminal apparatus 1 may be configured with up to four BWPs for which one downlink carrier BWP is activated at a certain time. The terminal apparatus 1 may be configured with up to four BWPs for which one uplink carrier BWP is activated at a certain time. In the case of carrier aggregation, the BWP may be configured for each serving cell. At this time, one BWP being configured in a certain serving cell may be expressed as that no BWP is configured. Two or more BWPs being configured may be expressed as that the BWP is configured.

MAC Entity Operation

In an activated serving cell, there is always one active (activated) BWP. BWP switching for a certain serving cell is used to activate an inactive (deactivated) BWP and deactivate an active (activated) BWP. The BWP switching for a certain serving cell is controlled by a PDCCH indicating a downlink assignment or an uplink grant. The BWP switching for a certain serving cell may be further controlled by the MAC entity itself at the start of the BWP inactivity timer or the random access procedure. In the addition of the SpCell (PCell or PSCell) or the activation of the SCell, one BWP is initially active without receiving a PDCCH indicating a downlink assignment or an uplink grant. The initially active BWP may be designated by an RRC message sent from the base station apparatus 3 to the terminal apparatus 1. The active BWP for a certain serving cell is designated by the RRC or PDCCH sent from the base station apparatus 3 to the terminal apparatus 1. In an Unpaired spectrum (such as Time Division Duplex (TDD) bands), a downlink BWP (DL BWP) and an uplink BWP (UL BWP) are paired, and the BWP switching is common to the UL and the DL. In the active BWP for each of the activated serving cells for which the BWP is configured, the MAC entity of the terminal apparatus 1 applies normal processing. The normal processing includes transmitting the UL-SCH, transmitting the RACH, monitoring the PDCCH, transmitting the PUCCH, transmitting the SRS, and receiving the DL-SCH. In the inactive BWP for each of the activated serving cells for which the BWP is configured, the MAC entity of the terminal apparatus 1 does not transmit the UL-SCH, does not transmit the RACH, does not monitor the PDCCH, does not transmit the PUCCH, does not transmit the SRS, or does not receive the DL-SCH. In a case that a certain serving cell is deactivated, the active BWP may not be present (e.g., the active BWP is deactivated).

RRC Operation

A BWP Information Element (IE) included in the RRC message (broadcast system information or information sent in a dedicated RRC message) is used to configure the BWP. The RRC message transmitted from the base station apparatus 3 is received by the terminal apparatus 1. For each serving cell, a network (such as the base station apparatus 3) configures, for the terminal apparatus 1, at least an initial BWP including at least a downlink BWP and one uplink BWP (such as in a case that the serving cell is configured with an uplink) or two uplink BWPs (such as in a case that a supplementary uplink is used). Furthermore, the network may configure additional uplink BWP or downlink BWP for a certain serving cell. The BWP configuration is divided into an uplink parameter and a downlink parameter. The BWP configuration is also divided into a common parameter and a dedicated parameter. The common parameter (such as a BWP uplink common IE, a BWP downlink common IE) is cell specific. The common parameter for the initial BWP of the primary cell is also provided with system information. To all other serving cells, the network provides the common parameters with dedicated signals. The BWP is identified by a BWP ID. The BWP ID of the initial BWP has 0. The BWP IDs of the other BWPs have a value from 1 to 4.

The dedicated parameter for the uplink BWP includes the SRS configuration. The uplink BWP corresponding to the dedicated parameter for the uplink BWP is associated with one or more SRSs corresponding to the SRS configuration included in the dedicated parameter for the uplink BWP.

The terminal apparatus 1 may be configured with one primary cell and up to 15 secondary cells.

The time and frequency resources for transmitting the SRS used by the terminal apparatus 1 are controlled by the base station apparatus 3. More specifically, the configuration imparted by the higher layer for the above-described BWP includes a configuration related to the SRS. The configuration related to the SRS includes a configuration of an SRS resource, a configuration for an SRS resource set, and a configuration of a trigger state. Hereinafter, each configuration will be described.

A case that one or more SRS resources are configured will be described. The base station apparatus 3 configures multiple SRS resources for the terminal apparatus 1. The multiple SRS resources are associated with multiple symbols in the back of the uplink slot. For example, suppose that four SRS resources are configured and each SRS resource is associated with each symbol of four symbols in the back of the slot. The terminal apparatus 1 may transmit using a transmission beam (transmission filter) for the SRS symbol. However, a case may be included in which the terminal apparatus 1 transmits not using a transmission beam for the SRS symbol.

Figure 6:
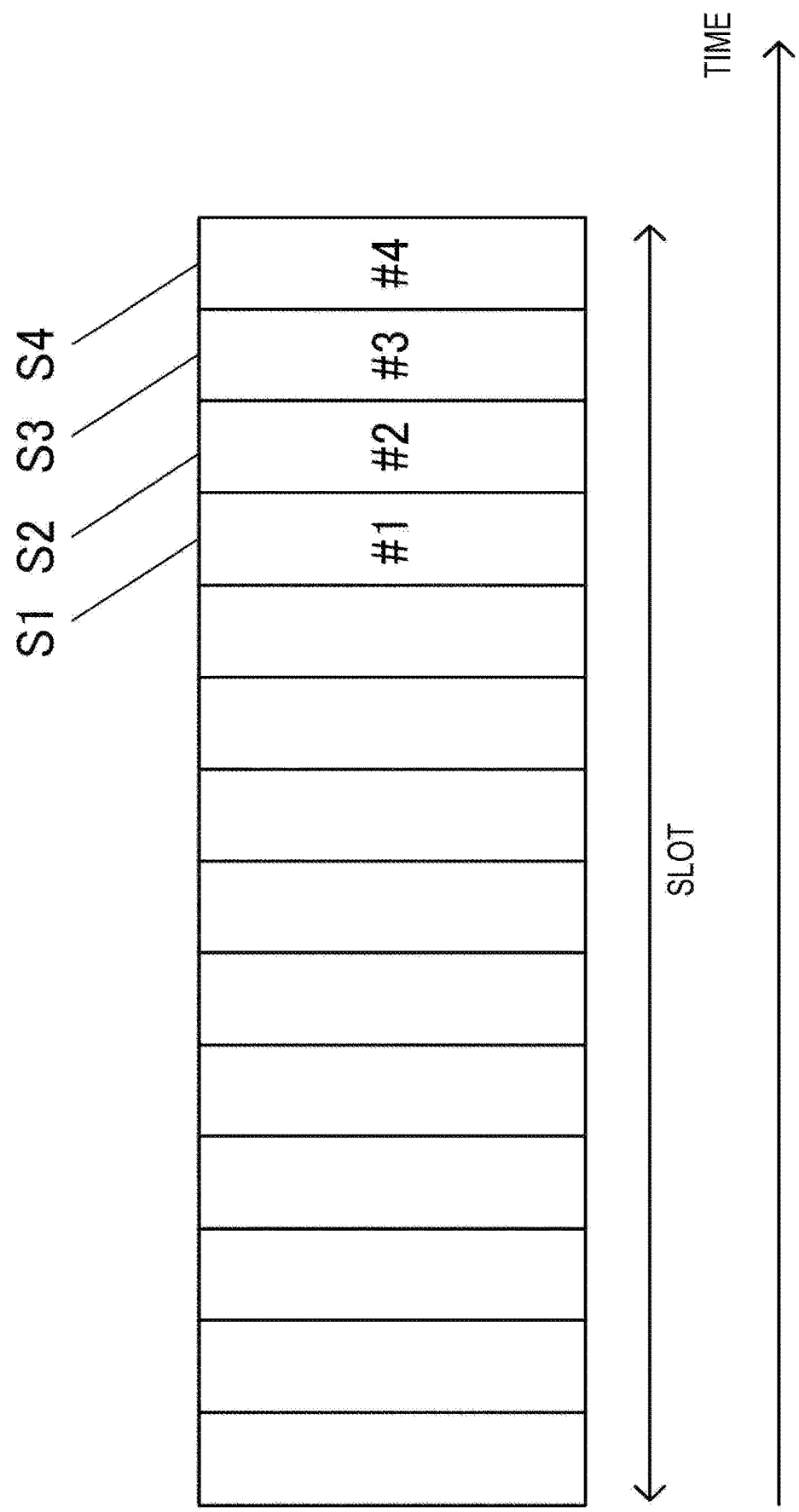
FIG. 6 is a diagram illustrating an example of an SRS resource.

FIG. 6 illustrates an example of the SRS symbols in a case that four SRS resources are configured. S1 represents an SRS resource associated with an SRS resource #1, S2 represents an SRS resource associated with an SRS resource #2, S3 represents an SRS resource associated with an SRS resource #3, and S4 represents is an SRS resource associated with an SRS resource #4. The terminal apparatus 1 applies each transmission beam to each of the respective resources based on the configuration to transmit the SRS.

The terminal apparatus 1 may use different transmit antenna ports for the respective SRS resources to perform transmission. For example, the terminal apparatus 1 may use an antenna port 10 for S1, an antenna port 11 for S2, an antenna port 12 for S3, and an antenna port 13 for S4 to transmit the SRS.

The terminal apparatus 1 may use multiple transmit antenna ports or a transmit antenna port group for each of the SRS resources to transmit the SRS. For example, the terminal apparatus 1 may use the antenna ports 10 and 11 for S1, and the antenna ports 12 and 13 for S2 to transmit the SRS.

The configuration of the SRS resource includes spatial relationship information (Spatial Relation Info). The spatial relationship information is information for applying the separately applied reception or transmission filter configuration to the transmission filter of the sounding reference signal and acquiring a beam gain. For identification of the separately applied reception or transmission filter configuration, any of the block of synchronization signals, the CSI reference signal, and the sounding reference signal is configured as a signal to be received or transmitted.

The configuration of the SRS resource may include, in addition to spatial relationship information, at least one or more of the information elements described below.

(1) Information or index related to symbols for transmitting the sounding reference signal (2) Information on antenna ports for transmitting the sounding reference signal (3) Frequency hopping pattern of the sounding reference signal The terminal apparatus 1 may be configured with an SRS resource set including one or more SRS resource configurations. The SRS resource set configuration may include information on an associated CSI reference signal (associatedCSI-RS) in addition to information on the transmit power control applied to the SRS resource included in the set.

The SRS resource configuration and/or the SRS resource set configuration may include information configuring a time domain behavior. The information configuring the time domain behavior configures any of periodic, semi-persistent, and aperiodic.

The base station apparatus 3 may select one or more of the respective configured SRS resources to indicate, for PUSCH transmission, an SRS Resource Indicator (SRI), an index associated with the SRS resource, or an index associated with the SRI to the terminal apparatus 1 through the DCI or the MAC Control Element (CE) and the RRC signaling. The terminal apparatus 1 may receive the SRI, the index associated with the SRS resource, or the index associated with the SRI among the respective configured SRS resources from the base station apparatus 3 through the DCI or the MAC CE and the RRC signaling. The terminal apparatus 1 performs the PUSCH transmission using one or more antenna ports for Demodulation Reference Signals (DMRS) and/or one or more antenna ports for the PUSCH associated with designated SRS resource. For example, in a case that the terminal apparatus 1 transmits the SRS using the transmission beams #1 to #4 for four SRS resources, and the SRS resource #2 is indicated as SRI from the base station apparatus 3 to the terminal apparatus 1, the terminal apparatus 1 may transmit the PUSCH using the transmission beam #2. In a case that multiple SRS resources are indicated, the PUSCH may be transmitted by Multiple Input Multiple Output Spatial Multiplexing (MIMO SM) using multiple transmission beams used for the SRS resources associated with indicated SRI.

The base station apparatus 3 may select one or more of the respective configured SRS resources to indicate, for PUCCH transmission, a SRI, an index associated with the SRS resource, or an index associated with the SRI to the terminal apparatus 1 through the DCI or the MAC CE and the RRC signaling. Information for identifying the SRS resource associated with the PUCCH is included in the DCI for performing downlink resource allocation. The terminal apparatus 1 decodes PDSCH based on the DCI for performing the downlink resource allocation, and transmits a HARQ-ACK on a PUCCH resource indicated by the DCI for performing the downlink resource allocation. The terminal apparatus 1 may receive the SRI, the index associated with the SRS resource, or the index associated with the SRI among the respective configured SRS resources from the base station apparatus 3 through the DCI or the MAC CE and the RRC signaling. The terminal apparatus 1 performs the PUCCH transmission using one or more antenna ports for the DMRS and/or one or more antenna ports for the PUCCH associated with designated SRS resource.

The base station apparatus 3 may associate periodicity and offset information with an SRS resource for which a time domain behavior is configured to be periodic among the respective SRS resources, and indicate the information to the terminal apparatus 1 through the DCI or the MAC CE and the RRC signaling. The terminal apparatus 1 periodically performs SRS transmission using the transmission periodicity and offset information associated with the SRS resource, for the SRS resource for which the time domain behavior is configured to be periodic among the respective SRS resources.

The base station apparatus 3 may associate periodicity and offset information with an SRS resource for which a time domain behavior is configured to be semi-persistent among the respective SRS resources, and indicate the information to the terminal apparatus 1 through the DCI or the MAC CE and the RRC signaling. The base station apparatus 3 may indicate activation/deactivation of the SRS resource to the terminal apparatus 1 through the DCI or the MAC CE and the RRC signaling, for the SRS resource for which the time domain behavior is configured to be semi-persistent among the respective SRS resources. The terminal apparatus 1 may receive the activation/deactivation of the SRS resource from the base station apparatus 3 through the DCI or the MAC CE and the RRC signaling, for the SRS resource for which the time domain behavior is configured to be semi-persistent among the respective SRS resources. In a case that the terminal apparatus 1 receives the activation indication, the terminal apparatus 1 uses the information or index related to the symbols for transmitting the SRS associated with the designated SRS resource, and/or the information on the antenna ports for transmitting the SRS, and/or the information on the frequency hopping pattern of the SRS to periodically perform the SRS transmission by use of the periodicity and offset information associated with the designated SRS resource. In a case that the terminal apparatus 1 receives the deactivation indication, the terminal apparatus 1 stops the SRS transmission of the designated SRS resource.

The base station apparatus 3 may indicate an SRS transmission request (SRS request) to the terminal apparatus 1 through the DCI or the MAC CE and the RRC signaling, for an SRS resource for which a time domain behavior is configured to be aperiodic among the respective SRS resources. The terminal apparatus 1 may receive the SRS transmission request (SRS request) from the base station apparatus 3 through the DCI or the MAC CE and the RRC signaling, for the SRS resource for which the time domain behavior is configured to be aperiodic among the respective SRS resources. In a case that the terminal apparatus 1 receives the SRS transmission request (SRS request), the terminal apparatus 1 uses the information or index related to the symbols for transmitting the SRS associated with the designated SRS resource, and/or the information on the antenna ports for transmitting the SRS, and/or the information on the frequency hopping pattern of the SRS to perform the SRS transmission by use of the periodicity and offset information associated with the designated SRS resource. The SRS transmission request (SRS request) includes one or more trigger states, and one or more trigger states is associated with each SRS resource configuration and/or each SRS resource set configuration for which a time domain behavior is configured to be aperiodic among the respective SRS resource configurations and/or the respective SRS resource set configurations.

Next, a configuration of the trigger state will be described. Each trigger state is associated with a configuration for one or more SRS resource sets.

For the SRS resource set for which the time domain behavior is aperiodic, the trigger state is configured by the higher layer for the SRS transmission in one or more SRS resource sets for the uplink channel state information (CSI) and/or channel sounding and/or beam management on one or more component carriers. In order to trigger the SRS transmission in the aperiodic SRS resource set, one set of SRS trigger states is configured by a higher layer parameter. Each trigger state is indicated by using an SRS request field included in the DCI (e.g., DCI format 0_1, DCI format 1_1, DCI format 2_3).

At this time, the terminal apparatus performs the following operations.

In a case that a value of the SRS request field 0, SRS transmission is not requested.

In a case that the value of the SRS request field is 1 or 2 or 3, SRS transmission is performed based on the configuration for the SRS resource set associated with the corresponding trigger state. At this time, the terminal apparatus transmits the SRS based on configuration information included in the configuration for the SRS resource from the SRS resource set.

The configuration for each SRS resource set includes information configuring the time domain behavior, and an index or identity of the signal related to the spatial relationship information.

FIG. 7 illustrates an example of the RRC configuration for the SRS and the SRS request field in a certain serving cell #1. Here, it is assumed that the number of BWPs configured for the serving cell is two. As illustrated in FIG. 7, a list of a configuration for a BWP index #1 in a serving cell #1 is configured in the information on the SRS of the serving cell #1, and four configurations for the SRS resource set are configured in the list. Among those configurations, the configuration of the aperiodic SRS resource set corresponds to the configurations #1 to #3 for the SRS resource set.

The configuration #1 for the SRS resource set is associated with a trigger state #1, the configuration #2 for the SRS resource set is associated with a trigger state #2, and the configuration #3 for the SRS resource set is associated with a trigger state #3. As illustrated in FIG. 7, "00" of the SRS request field indicates that the SRS is not transmitted. The trigger state #0 is associated with "01", the trigger state #1 is associated with "10", and the trigger state #2 is associated with "11".

The terminal apparatus 1 transmits the SRS based on the configuration for the SRS resource set associated with the configuration related to the SRS configured by the RRC based on the value of the SRS request field included in the DCI. At this time, the terminal apparatus 1 transmits the SRS based on the configuration information included in the configuration related to the SRS from the configuration for the SRS resource set associated with the configuration related to the SRS.

Moreover, each configuration related to the SRS is associated with the BWP in the serving cell. In FIG. 6, an SRS configuration #1 is associated with the BWP index #1.

Here, in the example described above, the configuration for one SRS resource set is configured for one value of the SRS request field, but multiple SRS resource sets may be associated.

FIG. 8 illustrates an example of the configuration related to the SRS configured through the RRC and the SRS request field in certain two serving cells. In the example in FIG. 8, each of the configurations for the SRS resource set for which the time behavior is aperiodic is associated with the trigger state, similar to FIG. 7.

In a case that the value of the SRS request field of 10 is indicated, the terminal apparatus 1 transmits the SRS resource set in the serving cell #1. In other words, the value (information) of the SRS request field indicates one of multiple trigger states, and each of the multiple trigger states is configured for each serving cell, and is associated with the configurations of one or more SRS resource sets. Note that the value of the SRS request field may be stated as information included in the SRS request field.

Here, a BWP index of an SRS configuration #2 is set to "active" rather than the actual index of the configured BWP. This means association with the activated BWP. For example, in a case that a BWP indicating the BWP index #1 is activated in a slot for the terminal apparatus 1, the SRS configuration #2 is a configuration corresponding to the activated BWP index #1, and the terminal apparatus 1 transmits the SRS resource set of the corresponding BWP #1. In other words, the SRS request field included in the DCI of the PDCCH includes a trigger state, each trigger state may be associated with a configuration for one or more SRS resource sets, and the SRS configuration may be configured to be associated with the activated BWP of a serving cell c.

FIG. 8 illustrates an example of a case that two serving cells are configured. Here, the number of configured serving cells is two, and the example is illustrated in which a trigger state is assigned to a configuration for an aperiodic SRS resource set in each cell. As illustrated in the figure, the SRS request field is associated with the configuration for multiple aperiodic SRS resource sets. For example, the trigger state #0 of the serving cell #1 and the trigger state #0 of the serving cell #2 are configured for a code point "01".

Here, in a case that the value of the SRS request field of "10" is indicated in a certain slot for the terminal apparatus 1, the terminal apparatus 1 transmits the SRS resource set of the BWP #1 in the serving cell #1 and the SRS resource set of the BWP #1 in the serving cell #2. At this time, in a case that both the BWP #1 in the serving cell #1 and the BWP #1 in the serving cell #2 are activated, the terminal apparatus 1 transmits the SRS resource sets of the BWP #1 in the serving cell #1 and the BWP #1 in the serving cell #2.

In a case that the BWP #1 in the serving cell #1 is activated and the BWP #2 in the serving cell #2 is activated, the terminal apparatus 1 reports the CSI of the BWP #1 in the serving cell #1. In this manner, multiple serving cells are configured, and the SRS resource set for each serving cell indicated by the SRS request field value is transmitted. In other words, the terminal apparatus 1 receives the PDCCH carrying the DCI including the SRS request field, and transmits the CSI report of the BWP indicated by the activated BWP index in a case that the SRS transmission request of the BWP in the multiple serving cells is triggered based on the SRS request field. At this time, the SRS request field indicates a trigger state, and the trigger state indicates one of multiple states. Each state of the multiple states is configured for each serving cell, and is associated with a configuration for one or more SRS resource sets and a configuration for one or more SRS resource sets, and a BWP index for each serving cell.

The example described above illustrates the case that the configuration for the SRS resource set for each serving cell is always associated with the configuration for the BWP index, but the associated information may not be configured in a case of one BWP. In this case, the SRS resource set may be transmitted on based on the bandwidth of the serving cell.

In the example described above, the configuration for the SRS resource set includes the information indicating an index of the trigger state, but the configuration for the SRS resource set may include a list of trigger states, and which configuration for the SRS resource set each trigger state includes may be configured.

Hereinafter, the spatial domain transmission filter applied to the sounding reference signal transmission will be described.

As described above, the base station apparatus 3 can configure, for the terminal apparatus 1, the spatial relationship information (Spatial Relation Info) as a block of synchronization signals in the configuration of a certain SRS resource. The terminal apparatus 1 configured with the spatial relationship information (Spatial Relation Info) as the block of synchronization signals receives various downlink signals. The terminal apparatus 1 identifies, among the various downlink signals, a block of synchronization signals associated with the SRS resource in the SRS configuration, and identifies the spatial domain reception filter applied in a case of receiving the synchronization signal block. Furthermore, in a case of transmitting the SRS resource, the terminal apparatus 1 applies the spatial domain reception filter as a spatial domain transmission filter, and transmits the SRS resource.

Next, the identification of the spatial domain reception filter and the SRS resource transmission taking into account the BWP switching will be described. With the BWP switching, the block of synchronization signals and/or the SRS resource configured for the terminal apparatus 1 in the SRS configuration may become the inactive BWP. Specifically, the SRS resource corresponding to the inactive BWP in a case that the SRS configuration is notified becomes the active BWP on and before the transmission timing of the SRS resource with the BWP switching. Alternatively, the block of synchronization signals corresponding to the active BWP in a case that the SRS configuration is notified becomes the inactive BWP on and before the transmission timing of the SRS resource with the BWP switching.

In the case that the SRS resource corresponding to the inactive BWP in a case that the SRS configuration is notified becomes the active BWP on and before the transmission timing of the SRS resource with the BWP switching, the terminal apparatus 1 identifies a spatial domain reception filter applied in a case that the configured block of synchronization signals is transmitted on the active DL BWP. Furthermore, the terminal apparatus 1 transmits the SRS resource using the spatial domain reception filter described above as a spatial domain transmission filter on the activated UL BWP. The terminal apparatus 1 may not transmit the SRS resource in a case that the transmission timing of the SRS resource is reached earlier than a reception timing of the block of synchronization signals described above, and transmit the SRS resource on and after the reception timing of the synchronization signal block.

In a case that the block of synchronization signals corresponding to the active BWP in a case that the SRS configuration is notified becomes signals corresponding to the inactive DL BWP on and before the transmission timing of the SRS resource with the BWP switching, the terminal apparatus 1 does not transmit the SRS resource.

In the example described above, a spatial domain reception filter applied in a case of receiving the block of synchronization signals that is notified in the SRS configuration and transmitted on the active DL BWP is identified, but a spatial domain reception filter applied in a case of receiving the block of synchronization signals that is configured for another SRS resource in the SRS configuration may be used as the spatial domain transmission filter applied for the transmission of the SRS resource.

As described above, the base station apparatus 3 can configure, for the terminal apparatus 1, the spatial relationship information (Spatial Relation Info) as a CSI reference signal in the configuration of a certain SRS resource. The terminal apparatus 1 configured with the spatial relationship information (Spatial Relation Info) as the CSI reference signal receives various downlink signals. The terminal apparatus 1 identifies, among the various downlink signals, a CSI reference signal associated with the SRS resource in the SRS configuration, and identifies the spatial domain reception filter applied in a case of receiving the CSI reference signal. Furthermore, in a case of transmitting the SRS resource, the terminal apparatus 1 applies the spatial domain reception filter as a spatial domain transmission filter, and transmits the SRS resource.

Next, the identification of the spatial domain reception filter and the SRS resource transmission taking into account the BWP switching will be described. With the BWP switching, the CSI reference signal and/or the SRS resource configured for the terminal apparatus 1 in the SRS configuration may become the inactive BWP. Specifically, the SRS resource corresponding to the inactive BWP in a case that the SRS configuration is notified becomes the active BWP on and before the transmission timing of the SRS resource with the BWP switching. Alternatively, the CSI reference signal corresponding to the active BWP in a case that the SRS configuration is notified becomes the inactive BWP on and before the transmission timing of the SRS resource with the BWP switching.

In the case that the SRS resource corresponding to the inactive BWP in a case that the SRS configuration is notified becomes the active BWP on and before the transmission timing of the SRS resource with the BWP switching, the terminal apparatus 1 identifies a spatial domain reception filter applied in a case that the configured CSI reference signal is transmitted on the active DL BWP. Furthermore, the terminal apparatus 1 transmits the SRS resource using the spatial domain reception filter described above as a spatial domain transmission filter on the activated UL BWP. The terminal apparatus 1 may not transmit the SRS resource in a case that the transmission timing of the SRS resource is reached earlier than a reception timing of the CSI reference signal described above, and transmit the SRS resource on and after the reception timing of the CSI reference signal. Although the terminal apparatus 1 may not transmit the SRS resource in the case that the transmission timing of the SRS resource is reached earlier than the reception timing of the CSI reference signal described above, the spatial domain reception filter applied in a case that the CSI reference signal transmitted earlier than the reception timing of the CSI reference signal is transmitted on the active DL BWP is transmitted.

In a case that the CSI reference signal corresponding to the active BWP in a case that the SRS configuration is notified becomes signals corresponding to the inactive DL BWP on and before the transmission timing of the SRS resource with the BWP switching, the terminal apparatus 1 does not transmit the SRS resource.

In the example described above, a spatial domain reception filter applied in a case of receiving the CSI reference signal that is notified in the SRS configuration and transmitted on the active DL BWP is identified, but a spatial domain reception filter applied in a case of receiving the CSI reference signal that is configured for another SRS resource in the SRS configuration may be used as the spatial domain transmission filter applied for the transmission of the SRS resource.

As described above, the base station apparatus 3 can configure, for the terminal apparatus 1, the spatial relationship information (Spatial Relation Info) as an uplink reference signal (SRS resource) in the configuration of a certain SRS resource. Hereinafter, the former SRS resource is referred to as an SRS resource of interest and the latter SRS resource is referred to as a reference SRS resource. The terminal apparatus 1 configured with the spatial relationship information (Spatial Relation Info) as the reference SRS resource receives various uplink signals. The terminal apparatus 1 identifies, among the various uplink signals, a reference SRS resource associated with the SRS resource of interest in the SRS configuration, and identifies the spatial domain transmission filter applied in a case of transmitting reference SRS resource. Furthermore, in a case of transmitting the SRS resource of interest, the terminal apparatus 1 applies the spatial domain transmission filter and transmits the SRS resource of interest.

Next, the identification of the spatial domain transmission filter and the SRS resource transmission taking into account the BWP switching will be described. With the BWP switching, the SRS resource of interest configured for the terminal apparatus 1 in the SRS configuration may become the inactive BWP. Specifically, the SRS resource of interest corresponding to the inactive BWP in a case that the SRS configuration is notified becomes the active BWP on and before the transmission timing of the SRS resource of interest with the BWP switching. Alternatively, the SRS resource of interest corresponding to the active BWP in a case that the SRS configuration is notified becomes the inactive BWP on and before the transmission timing of the SRS resource of interest with the BWP switching.

In the case that the SRS resource of interest corresponding to the inactive BWP in a case that the SRS configuration is notified becomes the active BWP on and before the transmission timing of the SRS resource of interest with the BWP switching, the terminal apparatus 1 identifies a spatial domain transmission filter applied in a case that the configured reference SRS resource is transmitted on the active UL BWP. Furthermore, the terminal apparatus 1 transmits the SRS resource of interest using the spatial domain transmission filter described above on the activated UL BWP. The terminal apparatus 1 may not transmit the SRS resource of interest in a case that the transmission timing of the SRS resource of interest is reached earlier than the transmission timing of the reference SRS resource described above, and transmit the SRS resource of interest at and after the transmission timing of the reference SRS resource.

In a case that the reference SRS resource corresponding to the active BWP in a case that the SRS configuration is notified becomes signals corresponding to the inactive UL BWP at and before the transmission timing of the SRS resource of interest with the BWP switching, the terminal apparatus 1 does not transmit the SRS resource of interest.

In the example described above, a spatial domain transmission filter applied in a case of transmitting the reference SRS resource that is notified in the SRS configuration and transmitted on the active UL BWP is identified, but a spatial domain transmission filter applied in a case of transmitting the reference SRS resource that is configured for another SRS resource in the SRS configuration may be used for the transmission of the SRS resource.

As described above, the base station apparatus 3 can configure, for the terminal apparatus 1, the associated CSI reference signal (associatedCSI-RS) in the configuration of a certain SRS resource set. The terminal apparatus 1 configured with the configuration of a certain CSI reference signal as the associated CSI reference signal receives various downlink signals. The terminal apparatus 1 identifies, among the various downlink signals, an associated CSI reference signal associated with the SRS resource set in the SRS configuration, and identifies the spatial domain reception filter applied in a case of receiving the CSI reference signal. Furthermore, in a case of transmitting the SRS resource set, the terminal apparatus 1 applies the spatial domain reception filter as a spatial domain transmission filter, and transmits the SRS resource set.

Next, the identification of the spatial domain reception filter and the SRS resource set transmission taking into account the BWP switching will be described. With the BWP switching, the associated CSI reference signal and/or the SRS resource set configured for the terminal apparatus 1 in the SRS configuration may become the inactive BWP. Specifically, the SRS resource set corresponding to the inactive BWP in a case that the SRS configuration is notified becomes the active BWP on and before the transmission timing of the SRS resource set with the BWP switching. Alternatively, the CSI reference signal corresponding to the active BWP in a case that the SRS configuration is notified becomes the inactive BWP on and before the transmission timing of the SRS resource set with the BWP switching.

In the case that the SRS resource set corresponding to the inactive BWP in a case that the SRS configuration is notified becomes the active BWP on and before the transmission timing of the SRS resource set with the BWP switching, the terminal apparatus 1 identifies a spatial domain reception filter applied in a case that the configured associated CSI reference signal is transmitted on the active DL BWP. Furthermore, the terminal apparatus 1 transmits the SRS resource set using the spatial domain reception filter described above as a spatial domain transmission filter on the activated UL BWP. The terminal apparatus 1 may not transmit the SRS resource set in a case that the transmission timing of the SRS resource set is reached earlier than a reception timing of the associated CSI reference signal described above, and transmit the SRS resource set on and after the reception timing of the associated CSI reference signal. Although the terminal apparatus 1 may not transmit the SRS resource set in the case that the transmission timing of the SRS resource set is reached earlier than the reception timing of the associated CSI reference signal described above, the spatial domain reception filter applied in a case that the associated CSI reference signal transmitted earlier than the reception timing of the associated CSI reference signal is transmitted on the active DL BWP is transmitted.

In a case that the associated CSI reference signal corresponding to the active BWP in a case that the SRS configuration is notified becomes signals corresponding to the inactive DL BWP on and before the transmission timing of the SRS resource set with the BWP switching, the terminal apparatus 1 does not transmit the SRS resource set.

In the example described above, a spatial domain reception filter applied in a case of receiving the associated CSI reference signal that is notified in the SRS configuration and transmitted on the active DL BWP is identified, but a spatial domain reception filter applied in a case of receiving the associated CSI reference signal that is configured for another SRS resource set in the SRS configuration may be used as the spatial domain transmission filter applied for the transmission of the SRS resource set.

Examples of Aperiodic SRS will be described. The terminal apparatus 1 for which one or more SRS resource configurations are configured and the time domain behavior related to the SRS resource configuration (which may be stated as a type of SRS resource configuration, an SRS transmission type, a transmission method, or the like) is set to "aperiodic" may perform operations described below.

Receive a configuration of one or more SRS resource sets.

Receive an Activation command based on the downlink DCI or the group-common DCI or the uplink DCI. However, a DCI code point may activate one or more SRS resource sets. The DCI code point may be a value of the CSI request field.

If a spatial domain transmission filter (which may be referred to as a configuration for a QCL or a transmission beam or the like) parameter SRS-SpatialRelation-Info for SRS transmission in a higher layer is set to "SSB/PBCH", the terminal apparatus 1 transmits the SRS resource (or transmits the SRS by the SRS resource, as another way of expression) using a spatial domain transmission filter the same as the spatial domain transmission filter used for reception of the SS/PBCH block (which may be expressed as SSB/PBCH). —If a spatial domain transmission filter (which may be referred to as a configuration for a QCL or a transmission beam or the like) parameter SRS-SpatialRelationInfo for SRS transmission in a higher layer is set to "CSI-RS", the terminal apparatus 1 transmits the SRS resource (or transmits the SRS by the SRS resource, as another way of expression) using a spatial domain transmission filter the same as the spatial domain transmission filter used for reception of the periodic, semi-persistent, or aperiodic CSI-RS. —If a spatial domain transmission filter (which may be referred to as a configuration for a QCL or a transmission beam or the like) parameter SRS-SpatialRelationInfo for SRS transmission in a higher layer is set to "SRS", the terminal apparatus 1 transmits the SRS resource (or transmits the SRS by the SRS resource, as another way of expression) using a spatial domain transmission filter the same as the spatial domain transmission filter used for reception of the periodic, semi-persistent, or aperiodic SRS.

For the aperiodic SRS, at least one state of the DCI field is used to select at least one from the configured SRS resource sets.

A 2-bit SRS request field in DCI format 01 or 1_1 indicates the triggered SRS resource set. A 2-bit SRS request field in DCI format 2_3 indicates the triggered SRS resource set.

For the 2-bit SRS request field in DCI format 0_1 or 1_1, a value and description of the SRS request field as described below may be defined.

SRS request field value '00': (description) Not trigger an aperiodic SRS.

SRS request field value '01': (description) A first one or more SRS resource sets configured by the higher layer.

SRS request field value '10': (description) A second one or more SRS resource sets configured by the higher layer.

SRS request field value '11': (description) A third one or more SRS resource sets configured by the higher layer.

For the 2-bit SRS request field in DCI format 2_3, a value and description of the SRS request field as described below may be defined.

SRS request field value '00': (description) Not trigger an aperiodic SRS.

SRS request field value '01': (description) Trigger an aperiodic SRS for a first set of serving cells configured by the higher layer.

SRS request field value '10': (description) Trigger an aperiodic SRS for a second set of serving cells configured by the higher layer.

SRS request field value '11': (description) Trigger an aperiodic SRS for a third set of serving cells configured by the higher layer.

Note that the periodic SRS or the semi-persistent SRS may be referred to as a type 0 SRS, and an aperiodic SRS triggered by the downlink DCI may be referred to as a type 1 SRS.

If the terminal apparatus 1 is configured with association between the SRS and the CSI-RS by the higher layer parameters, and the configuration for the transmission method is configured with NonCodebook, one NZP CSI-RS resource associated with the SRS resource set with the identity of the NZP CSI-RS may be configured.

Next, a configuration of the state for the aperiodic SRS will be described. Multiple states indicated by the values of the information field (SRS request field) included in the DCI may be configured by the RRC layer.

The SRS configuration is configured for each uplink BWP in each serving cell. The SRS configuration includes a list of configurations for an SRS resource set and a list of identities of the SRS resource set. The SRS configuration may include a list of configurations for SRS resources and a list of identities of the SRS resources. The configuration for each SRS resource set included in the list of configurations for the SRS resource set includes an identity of the SRS resource set and identities of one or more SRS resources included in the SRS resource set. The configuration for each SRS resource set includes a configuration (which may be referred to as a resource type) indicating any of "Aperiodic", "Semi-persistent", or "Periodic" as an SRS transmission method. For example, in a case that the "aperiodic" is set, the SRS resource set is configured to transmit the aperiodic SRS.

In a case that "aperiodic" is set as the SRS transmission method, information (aperiodicSRS-ResourceTrigger) indicating which code point the SRS resource set corresponds to, and an offset from the triggered slot to the SRS transmission (where unit may be the number of slots or the number of OFDM symbols) are included in the information indicating "aperiodic". For example, in a case that the configuration of an SRS resource set includes information setting "aperiodic" and the information indicating which code point the SRS resource set corresponds to is "0", the SRS resource set corresponds to a first SRS resource set. In this case, the value of the SRS request field is "01" and the SRS transmission is triggered by the SRS resource included in the SRS resource set.

Next, an example of a case that multiple serving cells are configured will be described. In the case that multiple serving cells are configured, the uplink BWP is configured for each serving cell. For each uplink BWP in each serving cell, the SRS configuration is configured in the same manner as described above. Here, assuming that an SRS resource set having an identity #0 (or an index 0) of an uplink BWP #1 of a serving cell #0 is associated with the first SRS resource set, and an SRS resource set having an identity #0 of an uplink BWP #0 of a serving cell #1 is associated with the first SRS resource set, in a case that a value of the SRS request field included in the DCI is "01", the terminal apparatus 1 transmits the SRS by an SRS resource in the SRS resource set having the identity #0 of the uplink BWP #1 of the serving cell 0 and an SRS resource in the SRS resource set having the identity #0 of the uplink BWP #0 of the serving cell 1. Transmitting, on an uplink BWP associated with one state corresponding to a value of an SRS request field, the SRS by the SRS resource in the SRS resource set associated with the state is expressed as the SRS transmission on the uplink BWP in the serving cell corresponding to the value of the SRS request field. An uplink BWP in the serving cell and having the uplink BWP identity corresponding to the value of the SRS request field is expressed as the uplink BWP in the serving cell corresponding to the value of the SRS request field.

Here, in the case of Frequency Division Duplex (FDD, which may be referred to as a paired spectrum, a carrier, or frequency), one downlink BWP may be activated or switched in DCI format 1_0 or 1_1, and one uplink BWP may be activated or switched in DCI format 0_0 or 0_1. In the case of Time Division Duplex (TDD, which may be referred to as an unpaired spectrum, a carrier, or frequency), a downlink BWP and an uplink BWP may be activated or switched at the same timing in DCI format 0_0, 0_1, 1_0, or 1_1. The downlink BWP or the uplink BWP may be switched by the RRC layer.

Each BWP of one or more downlink BWPs may be identified by the downlink BWP index (or identity), and each BWP of one or more uplink BWPs may be identified by the uplink BWP index (or identity).

In the case that multiple serving cells are configured, each of the multiple states corresponding to the values of the SRS request field corresponds to the SRS resource set associated with the one or more uplink BWPs based on the RRC configuration described above. At this time, in a case that two serving cells are configured, there may be four conditions described below as conditions of the activation of the uplink BWP in the SRS resource set that is associated with one state corresponding a value of the SRS request field. Note that the uplink BWP in the following conditions may be an uplink BWP associated with the identity (index) of the uplink BWP in one or more serving cells associated with a state corresponding to the value of the SRS request field of the DCI.

Condition 1
  1. The uplink BWP of the serving cell #0 corresponding to the value of the SRS request field is activated.
  2. The uplink BWP of the serving cell #1 corresponding to the value of the SRS request field is activated.

Condition 2
  1. The uplink BWP of the serving cell #0 corresponding to the value of the SRS request field is activated.
  2. The uplink BWP of the serving cell #1 corresponding to the value of the SRS request field is not activated.

Condition 3
  1. The uplink BWP of the serving cell #0 corresponding to the value of the SRS request field is not activated.
  2. The uplink BWP of the serving cell #1 corresponding to the value of the SRS request field is activated.

Condition 4
  1. The uplink BWP of the serving cell #0 corresponding to the value of the SRS request field is not activated.
  2. The uplink BWP of the serving cell #1 corresponding to the value of the SRS request field is not activated.

In a case of the condition 1, since the uplink BWPs of the serving cells #0 and #1 associated with the condition corresponding to the value of the SRS request field are activated, the SRS is transmitted based on each SRS configuration.

In the case of the condition 2, since the uplink BWP of the serving cell #0 associated with the state corresponding to the value of the SRS request field is activated and the uplink BWP of the serving cell #1 associated with the state corresponding to the value of the SRS request field is not activated, the SRS is transmitted on the uplink BWP of the serving cell #0 based on the SRS configuration of the serving cell #0. At this time, the SRS transmission on the uplink BWP of serving cell #1 may be dropped.

In the case of the condition 3, since the uplink BWP of the serving cell #1 associated with the state corresponding to the value of the SRS request field is activated and the uplink BWP of the serving cell #0 associated with the state corresponding to the value of the SRS request field is not activated, the SRS is transmitted on the uplink BWP of the serving cell #1 based on the SRS configuration of the serving cell #0. At this time, the SRS transmission on the uplink BWP of serving cell #0 may be dropped.

In the case of the condition 4, since the uplink BWPs of the serving cells #0 and #1 associated with the condition corresponding to the value of the SRS request field are not activated, the terminal apparatus 1 may not expect this condition, that is, the trigger of the aperiodic SRS on the uplink BWP that is not activated. In a case that the base station apparatus 3 indicates a value that is not 00 (or 0) as the value of the SRS request field, the value of the SRS request field is at least a value corresponding to a state in which at least one of the uplink BWPs in the serving cell corresponding to the value of the SRS request field is activated.

In this manner, in the present invention, in a case that one of one or more configured uplink BWPs is activated in each serving cell and the SRS transmission in one or more serving cells is triggered, the SRS on the BWP indicated by the activated uplink BWP index may be transmitted. In the example described above, an example is given for two serving cells, but even in a case that three or more serving cells are configured, the same is applicable in that the SRS on the activated uplink BWP is transmitted.

In the present invention also, the SRS request field indicates a value of the SRS request field, each of the values of the SRS request field indicates one of multiple states, and each state of the multiple states is configured for each serving cell.

Furthermore, in the present invention, as described above, in the case that one of one or more configured downlink BWPs is activated in each serving cell, one of one or more configured uplink BWPs is activated in each serving cell, and the SRS transmission in one or more serving cells is triggered, the SRS on the BWP indicated by the activated uplink BWP index is transmitted.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, a Special Cell (SpCell) is referred to as a PCell of a MCG or a PSCell of a SCG, respectively, depending on whether the MAC entity is associated with the MCG or the SCG. Other than in the dual connectivity operation, a Special Cell (SpCell) is referred to as a PCell. The Special Cell (SpCell) supports a PUCCH transmission and a contention based random access.

Configurations of apparatuses according to the present embodiment will be described below. Here, an example is illustrated of a case that CP-OFDM is applied as a downlink radio transmission scheme, and CP-OFDM or DFTS-OFDM (SC-FDM) is applied as an uplink radio transmission scheme.

Figure 9:
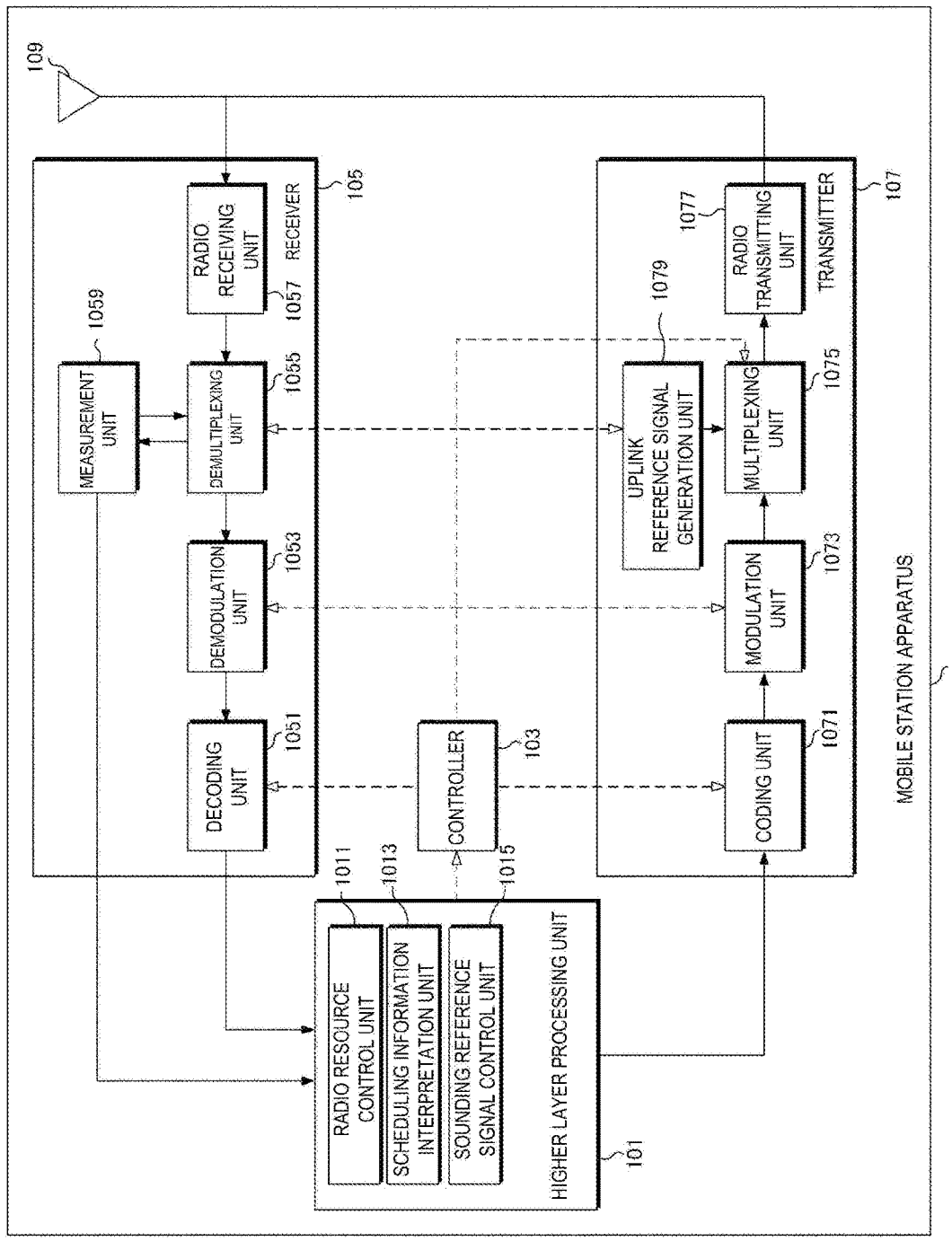
FIG. 9 is a schematic block diagram illustrating a configuration of a terminal apparatus 1 according to the present embodiment.

FIG. 9 is a schematic block diagram illustrating a configuration of the terminal apparatus 1 according to the present embodiment. As illustrated in, the terminal apparatus 1 is configured to include a higher layer processing unit 101, a controller 103, a receiver 105, a transmitter 107, and a transmit and/or receive antenna 109. The higher layer processing unit 101 is configured to include a radio resource control unit 1011, a scheduling information interpretation unit 1013, and a sounding reference signal control unit 1015. Furthermore, the receiver 105 is configured to include a decoding unit 1051, a demodulation unit 1053, a demultiplexing unit 1055, a radio receiving unit 1057, and a measurement unit 1059. The transmitter 107 includes a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal apparatus 1. Furthermore, the radio resource control unit 1011 generates information allocated in each channel for uplink, and outputs the generated information to the transmitter 107.

The scheduling information interpretation unit 1013 included in the higher layer processing unit 101 interprets the DCI format (scheduling information) received through the receiver 105, generates control information for control of the receiver 105 and the transmitter 107, in accordance with a result of interpreting the DCI format, and outputs the generated control information to the controller 103.

The sounding reference signal control unit 1015 indicates to the uplink reference signal generation unit 1079 to derive information related to the SRS resource configuration. The sounding reference signal control unit 1015 indicates to the transmitter 107 to transmit the SRS resource. The sounding reference signal control unit 1015 sets the configuration used for the uplink reference signal generation unit 1079 to generate the SRS. Additionally, the sounding reference signal control unit 1015 outputs the spatial relationship information and/or the information on the associated CSI reference signal to the controller 103. Additionally, the sounding reference signal control unit 1015 outputs the spatial domain reception filter input from the receiver 105 to the transmitter 107.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107. The controller 103 outputs the spatial relationship information and/or associated CSI reference signal input from the sounding reference signal control unit 1015 to the receiver 105 and/or the transmitter 107. The receiver 105 outputs, to the sounding reference signal control unit 1015, the spatial domain reception filter used in a case of receiving the downlink signal corresponding to the spatial relationship information and/or associated CSI reference signal input from the controller 103.

The radio receiving unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PDCCH or PDSCH, and the downlink reference signal. The demultiplexing unit 1055 performs compensation of channel on the PDCCH and the PUSCH, from a channel estimate input from the measurement unit 1059. Furthermore, the demultiplexing unit 1055 outputs the downlink reference signal resulting from the demultiplexing, to the measurement unit 1059.

The demodulation unit 1053 demodulates the downlink PDCCH and outputs a signal resulting from the demodulation to the decoding unit 1051. The decoding unit 1051 attempts to decode the PDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), 64 QAM, or 256 QAM and outputs a signal resulting from the demodulation to the decoding unit 1051. The decoding unit 1051 performs decoding in accordance with information of a transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate value from the downlink reference signal and outputs the calculated downlink channel estimate to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109. Additionally, the transmitter 107 outputs the spatial domain reception filter input from the sounding reference signal control unit 1015 to the multiplexing unit 1075.

The coding unit 1071 codes the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence determined according to a prescribed rule (formula), based on a physical cell identity (also referred to as a Physical Cell Identity (PCI), a cell ID, or the like) for identifying the base station apparatus 3, a bandwidth in which the uplink reference signal is mapped, a cyclic shift notified with the uplink grant, a parameter value for generation of a DMRS sequence, and the like. The uplink reference signal generation unit outputs the spatial domain transmission filter applied on transmitting the SRS resource to the multiplexing unit 1075.

Based on the information used for the scheduling of the PUSCH, the multiplexing unit 1075 determines the number of PUSCH layers to be spatially-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of PUSCH. The multiplexing unit 1075 multiplexes PUCCH and/or PUSCH signals and the generated uplink reference signal for each transmit antenna port. To be more specific, the multiplexing unit 1075 maps the PUCCH and/or PUSCH signals and the generated uplink reference signal to the resource elements for each transmit antenna port. The multiplexing unit 1075 performs precoding on the uplink data and the uplink reference signal using the spatial domain reception filter input from the transmitter 107 or the spatial domain transmission filter input from the uplink reference signal generation unit 1079.

The radio transmitting unit 1077 performs Inverse Fast Fourier Transform (IFFT) on a signal resulting from the multiplexing to perform modulation in compliance with an SC-FDM scheme, adds the Guard Interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 10:
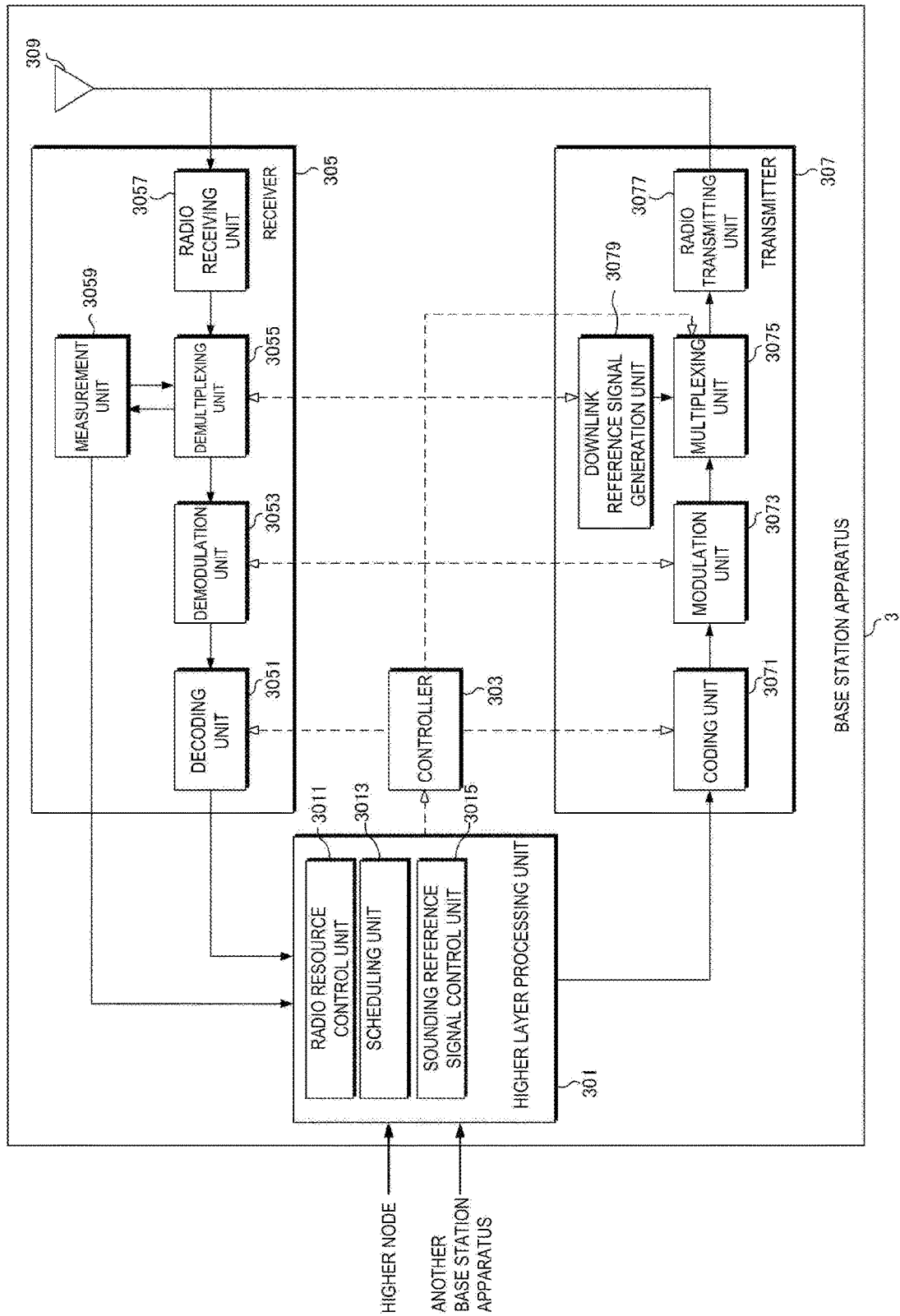
FIG. 10 is a schematic block diagram illustrating a configuration of a base station apparatus 3 according to the present embodiment.

FIG. 10 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 is configured to include a radio resource control unit 3011, a scheduling unit 3013, and a sounding reference signal control unit 3015. The receiver 305 is configured to include a decoding unit 3051, a demodulation unit 3053, a demultiplexing unit 3055, a radio receiving unit 3057, and a measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) allocated to the downlink PDSCH, system information, the RRC message, the MAC Control Element (CE), and the like, and outputs a result of the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received CSI and from the channel estimate, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (e.g., the DCI format) to be used for the scheduling of the physical channels (PDSCH or PUSCH), based on the result of the scheduling.

The sounding reference signal control unit 3015 included in the higher layer processing unit 301 controls the SRS transmission to be performed by the terminal apparatus 1. The sounding reference signal control unit 3015 transmits the configuration used for the terminal apparatus 1 to generate the SRS to the terminal apparatus 1 via the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes a reception signal received from the terminal apparatus 1 through the transmit and/or receive antenna 309, and outputs information resulting from the decoding to the higher layer processing unit 301. The radio receiving unit 3057 converts (down converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 3057 removes a portion corresponding to the Guard Interval (GI) from the digital signal resulting from the conversion. The radio receiving unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiving unit 3057 into PUCCH, PUSCH, and the signal such as the uplink reference signal. The demultiplexing is performed based on radio resource allocation information, predetermined by the base station apparatus 3 using the radio resource control unit 3011, that is included in the uplink grant notified to each of the terminal apparatuses 1. Furthermore, the demultiplexing unit 3055 performs channel compensation of the PUCCH and the PUSCH based on the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, 64 QAM, or 256 QAM, or in compliance with the modulation scheme that the base station apparatus 3 itself notified in advance with the uplink grant to each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information indicating the precoding to be performed on the sequences.

The decoding unit 3051 decodes the coded bits of the PUCCH and the PUSCH, which have been demodulated, at a transmission or original coding rate in compliance with a coding scheme predetermined in advance, the transmission or original coding rate being predetermined in advance or being notified in advance with the uplink grant to the terminal apparatus 1 by the base station apparatus 3 itself, and outputs the decoded uplink data and uplink control information to the higher layer processing unit 101. In a case that the PUSCH is retransmitted, the decoding unit 3051 performs the decoding with the coded bits input from the higher layer processing unit 301 and retained in a HARQ buffer, and the demodulated coded bits. The measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PDCCH, the PDSCH, and the downlink reference signal and transmits a signal resulting from the multiplexing to the terminal apparatus 1 through the transmit and/or receive antenna 309 or transmits the PDCCH, the PDSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PDSCH layers to be spatially-multiplexed, maps one or more pieces of downlink data to be transmitted on one PDSCH to one or more layers, and performs precoding on the one or more layers. The multiplexing unit 3075 multiplexes the downlink physical channel signal and the downlink reference signal for each transmit antenna port. The multiplexing unit 3075 maps the downlink physical channel signal and the downlink reference signal to the resource elements for each transmit antenna port.

The radio transmitting unit 3077 performs Inverse Fast Fourier Transform (IFFT) on the modulation symbol resulting from the multiplexing or the like to perform the modulation in compliance with an OFDM scheme, adds the guard interval to the OFDM-modulated OFDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

(1) To be more specific, the terminal apparatus 1 according to a first aspect of the present invention includes a receiver configured to receive a physical downlink control channel carrying downlink control information including a first information field, and a transmitter configured to transmit a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is transmitted.

(2) The base station apparatus 3 according to a second aspect of the present invention includes a transmitter configured to transmit a physical downlink control channel carrying downlink control information including a first information field, and a receiver configured to receive a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is received.

(3) A communication method according to a third aspect of the present invention is a communication method for a terminal apparatus, the method including receiving a physical downlink control channel carrying downlink control information including a first information field, and transmitting a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is transmitted.

(4) A communication method according to a fourth aspect of the present invention is a communication method for a base station apparatus, the method including transmitting a physical downlink control channel carrying downlink control information including a first information field, and receiving a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is received.

(5) An integrated circuit according to a fifth aspect of the present invention is an integrated circuit mounted on a terminal apparatus, the integrated circuit including a receiving unit configured to receive a physical downlink control channel carrying downlink control information including a first information field, and a transmitting unit configured to transmit a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is transmitted.

(6) An integrated circuit according to a sixth aspect of the present invention is an integrated circuit mounted on a base station apparatus, the integrated circuit including a transmitting unit configured to transmit a physical downlink control channel carrying downlink control information including a first information field, and a receiving unit configured to receive a sounding reference signal (SRS), wherein the first information field indicates first information, the first information indicates one of multiple states, each state of the multiple states is configured for a serving cell, and is associated with a configuration for one or more SRS resource sets and an uplink bandwidth part (BWP) index in each of a plurality of the serving cells, one or more downlink BWPs are configured in each of the plurality of the serving cells, one or more uplink BWPs are configured in each of the plurality of the serving cells, each BWP of the one or more downlink BWPs is identified by a downlink BWP index, each BWP of the one or more uplink BWPs is identified by the uplink BWP index, and in a case that one of the one or more downlink BWPs configured is activated in each of the plurality of the serving cells, one of the one or more uplink BWPs configured is activated in each of the plurality of the serving cells, and an SRS transmission in one or more serving cells of the plurality of the serving cells is triggered, the SRS for the BWP indicated by the uplink BWP index activated is received.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to the present invention, an example has been described in which the present invention is applied to a communication system constituted by a base station apparatus and a terminal apparatus, but the present invention can also be applied in a system in which terminals communicate with each other, such as D2D (Device to Device).

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal device configured and/or programmed to communicate with a base station device using a plurality of serving cells, the terminal device comprising:
higher layer circuitry configured and/or programmed to receive a configuration of one or more sounding reference signal (SRS) sets for each uplink bandwidth part (BWP) in each of the plurality of the serving cells,
reception circuitry configured and/or programmed to receive a physical downlink control channel (PDCCH) carrying downlink control information (DCI) including a first information field, and
transmission circuitry configured and/or programmed to transmit one or more SRSs in one or more SRS resource sets corresponding to a state indicated by a code point of the first information field, wherein
each of the one or more SRS resource sets is associated with the state,
the transmission circuitry is configured and/or programmed to transmit the SRS resources of one or more SRS resource sets of activated BWPs associated with the state corresponding to the code point of the first information field in a case that SRS transmission is triggered.

2. A base station device configured and/or programmed to communicate with a terminal device using a plurality of serving cells, the base station device comprising:
higher layer circuitry configured and/or programmed to transmit a configuration of one or more sounding reference signal (SRS) sets for each uplink bandwidth part (BWP) in each of the plurality of the serving cells,
transmission circuitry configured and/or programmed to transmit a physical downlink control channel (PDCCH) carrying downlink control information (DCI) including a first information field, and reception circuitry configured and/or programmed to receive one or more SRSs in one or more SRS resource sets corresponding to a state indicated by a code point of the first information field, wherein each of the one or more SRS resource sets is associated with the state, the reception circuitry is configured and/or programmed to receive the SRS resources of one or more SRS resource sets of activated BWPs associated with the state corresponding to the code point of the first information field in a case that SRS transmission is triggered.

3. A communication method by using a terminal device, the terminal device configured and/or programmed to communicate with a base station device using a plurality of serving cells, the communication method comprising:

receiving a configuration of one or more sounding reference signal (SRS) sets for each uplink bandwidth part (BWP) in each of the plurality of the serving cells, receiving a physical downlink control channel (PDCCH) carrying downlink control information (DCI) including a first information field, and transmitting one or more SRSs in one or more SRS resource sets corresponding to a state indicated by a code point of the first information field, wherein each of the one or more SRS resource sets is associated with the state, transmitting the SRS resources of one or more SRS resource sets of activated BWPs associated with the state corresponding to the code point of the first information field in a case that SRS transmission is triggered.

4. A communication method by using a base station device, the base station device configured and/or programmed to communicate with a terminal device using a plurality of serving cells, the communication method comprising:

transmitting a configuration of one or more sounding reference signal (SRS) sets for each uplink bandwidth part (BWP) in each of the plurality of the serving cells, transmitting a physical downlink control channel (PDCCH) carrying downlink control information (DCI) including a first information field, and receiving one or more0 SRSs in one or more SRS resource sets corresponding to a state indicated by a code point of the first information field, wherein each of the one or more SRS resource sets is associated with the state, receiving the SRS resources of one or more SRS resource sets of activated BWPs associated with the state corresponding to the code point of the first information field in a case that SRS transmission is triggered.

* * * * *